United States Patent
Johnson

(10) Patent No.: US 11,080,013 B1
(45) Date of Patent: Aug. 3, 2021

(54) AUDIO MENU NAVIGATION AND OPTION SELECTION VIA DISPLAY DEVICE

(71) Applicant: salesforce.com, inc., San Francisco, CA (US)

(72) Inventor: Trenton Johnson, Durham, NC (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/930,114

(22) Filed: May 12, 2020

(51) Int. Cl.
| | |
|---|---|
| *G06F 3/0482* | (2013.01) |
| *G06F 3/16* | (2006.01) |
| *G10L 15/22* | (2006.01) |
| *G06F 3/0488* | (2013.01) |
| *G06F 3/0484* | (2013.01) |

(52) U.S. Cl.
CPC ............ *G06F 3/167* (2013.01); *G06F 3/0482* (2013.01); *G06F 3/0488* (2013.01); *G06F 3/04842* (2013.01); *G10L 15/22* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 9,270,811 B1* | 2/2016 | Atlas ...................... | H04W 4/12 |
| 2009/0028308 A1* | 1/2009 | Pieper ............... | H04M 3/53333 |
| | | | 379/93.17 |
| 2017/0339263 A1* | 11/2017 | Jia ......................... | H04M 19/04 |
| 2018/0352083 A1* | 12/2018 | Lin ..................... | H04L 65/4015 |
| 2019/0387097 A1* | 12/2019 | Li ....................... | H04M 3/4938 |

* cited by examiner

*Primary Examiner* — Jeanette J Parker
(74) *Attorney, Agent, or Firm* — Holland & Hart LLP

(57) ABSTRACT

A method, apparatus, and system for communications to support audio menu navigation and option selection via display device is described. To support audio menu navigation and option selection via display device, a communication connection between an automated voice menu system and a user device is established, one or more option selections corresponding to a menu of options are determined, a user interface including an arrangement of elements corresponding to the one or more option selections is generated at the user device, an input from a user is received via the user interface, and a response is transmitted from the user device to the automated voice menu system via the communication connection based at least in part on the received input from the user, wherein the response is responsive to the audio feedback and indicates a selection of the subset of the determined one or more option selections.

16 Claims, 16 Drawing Sheets

AUDIO MENU NAVIGATION AND OPTION SELECTION VIA DISPLAY DEVICE

FIELD OF TECHNOLOGY

The present disclosure relates generally to database systems and communications, and more specifically to audio menu navigation and option selection via display device.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support communications between a user device and an automated voice menu system. For example, a user may communicate with an automated voice menu system via a user device to access a predetermined menu of options that are presented in a format that may be audibly understood by the user and that may be selected by an input from the user. However, a user may have to listen to an extensive list of options before an option the user is desiring is presented to the user via the automated voice menu system. Additionally, selection of an option by a user may cause an additional audio menu of options to be presented to the user that the user may have to listen to. Further, if a user desires to re-hear an option, they may have to listen to the entire list of options before hearing the one they desire again, which may limit efficient and effective interaction with an automated menu system by the user.

DETAILED DESCRIPTION

Figure 1:
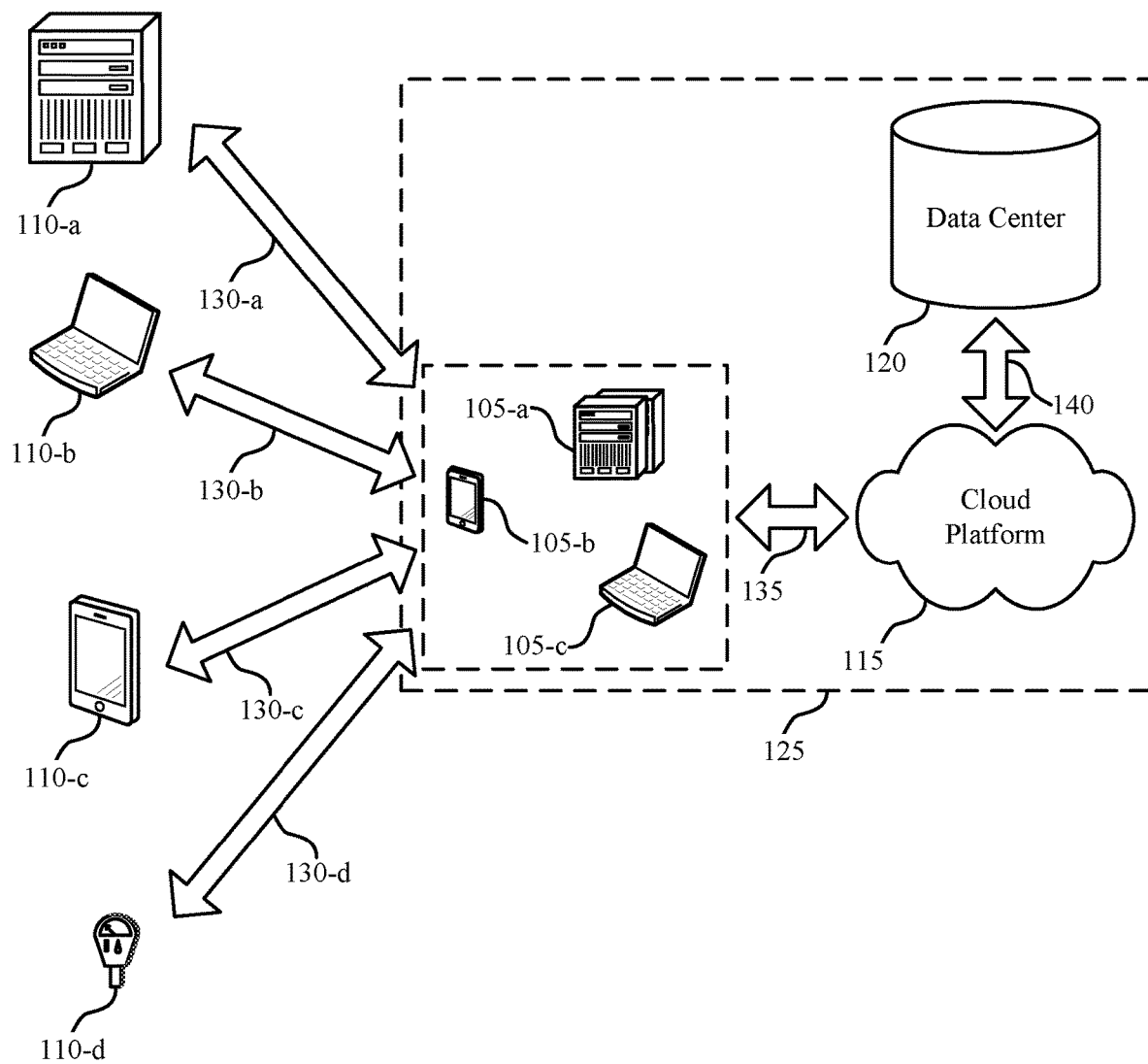
FIG. 1 illustrates an example of a system for communications that supports audio menu navigation and option selection via display device in accordance with aspects of the present disclosure.

The cloud platform may support communications between a user device and an automated voice menu system. For example, a cloud platform may support establishing a communication connection between an automated voice menu system and a user device such that the user device may determine one or more option selections corresponding to a menu of options presented to the user device by the automated voice menu system, present the one or more determined option selections to a user, receive an input from the user that corresponds to one or more of the determined option selections, and transmit a response to the automated voice menu that corresponds to the input from the user.

The automated voice menu system may generate audio feedback indicating a menu of options in response to the communication connection being established between the automated voice menu system and the user device. Based on the audio feedback, the user device may determine the option selections and may generate a user interface including an arrangement of elements that are presented to the user for selection and that correspond to the determined option selections. The user device may then receive the user input selecting one or more of the elements via the user interface and may transmit a response to the automated voice menu system that is based at least in part on the received input from the user and that is responsive to the audio feedback generated by the automated voice menu system.

The described techniques include converting audio feedback including one or more option selections generated by the automated voice system into option selections that may be presented to a user via a user device in a visual format to facilitate rapid identification and selection of one or more of the option selections by the user. The option selections may be presented on the user interface of the user device via an application on the user device or via replacement of a dial pad on the user interface with an arrangement of elements that correspond to the one or more options selections. In some cases, the user device may transmit a capability message to the automated voice menu system to indicate that the user device has a capability to generate a user interface based on the option selections presented by the automated voice menu system to further facilitate efficient presentation of the option selections to the user.

In some cases, a user may select the one or more desired option selections using one or more of a touch input, a verbal input, a gesture or expression input, or any combination of these inputs. In other cases, an input from the user selecting one or more of the displayed elements may cause a second arrangement of elements to be displayed on the user interface soliciting additional input from the user. Additionally, the user device may determine a reception capability of the automated voice menu system and may transmit a response to the automated voice menu system based on the received input and the determined reception capability of the automated voice menu system.

Aspects of the disclosure are initially described in the context of an environment supporting an on-demand database service. Additional aspects are described with reference to systems that support audio menu navigation and option selection via a display device. Aspects of the disclosure are further illustrated by and described with reference to apparatus diagrams, system diagrams, and flowcharts that relate to audio menu navigation and option selection via display device.

FIG. 1 illustrates an example of a system 100 for cloud computing that supports audio menu navigation and option selection via display device in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Techniques are described herein to support audio menu navigation and option selection via a display device. The techniques may provide for establishing a communication connection between an automated voice menu system and a user device such that the user device may determine one or more option selections corresponding to a menu of options presented to the user device by the automated voice menu system, present the one or more determined option selections to a user, receive an input from the user that corresponds to one or more of the determined option selections, and transmit a response to the automated voice menu that corresponds to the input from the user. Such techniques may facilitate efficient communication between an automated voice menu system and a user to facilitate the user correctly and rapidly reaching a desired contact or information source via the automated voice menu system without a need for an operator.

The system 100, including the cloud platform 115, may support audio menu navigation and option selection via a display device, such as one or more of the cloud clients 105. For example, audio feedback generated by an automated voice menu system may be identified by at least a portion of the system 100, and one or more option selections may be determined from a menu of options presented by the audio feedback. The system 100 may also generate, based at least in part on the one or more option selections that were determined, a user interface at some portion of the system 100 for a user to interact with an arrangement of elements on the user interface. The system 100 may additionally receive an input from the user selecting one or more of the elements corresponding to one or more option selections and may transmit a response to another portion of the system 100 that is based on the selection of the one or more elements by the user and that is responsive to the audio feedback presented by the automated voice menu system.

Audio menu navigation and option selection using a display device, such as a user device, may include a user contacting a business or an organization (e.g., a bank, the IRS, a utility company) in order to obtain information or to provide information (e.g., paying bills, providing meter readings, obtaining account balances). In some examples, the user may place a telephonic call to a business that may be using an automated voice menu system to direct a user's communications to appropriate departments or operators. In such an example, the automated voice menu system may provide audio feedback in response to the user establishing communications with the system via their user device, and the user device may determine the possible options from the audio feedback and may present the determined options to the user. In the example where the user desires to obtain their account balance, they may select an option displayed on their user device that corresponds to obtaining their account balance. Selection of this option on the display device may transmit a response that is responsive to the received audio feedback and that indicates to the automated voice menu system that the user would like to obtain their account balance. If the business has no further options, the user may be placed in communication with an operator or with some other entity that is able to provide the desired information. If there are additional options that the user must select to proceed, the additional options will be determined by the user device from additional audio feedback from the automated voice menu system and will be presented to the user on the user interface as additional elements corresponding to the additional options for selection. Accordingly, a user may arrive at a desired communication location within the business without the need to listen to one or more audio menus in order to select their desired option(s).

By implementing audio menu navigation and option selection via a display device, the user experience of contacting a business or organization in order to reach a specific department or obtain specific information may improve by more efficiently and effectively facilitating the user in arriving at the correct source of information within that business or organization while reducing the need for human operators and reducing the time a user may have to wait to select options to arrive at the desired source of information.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
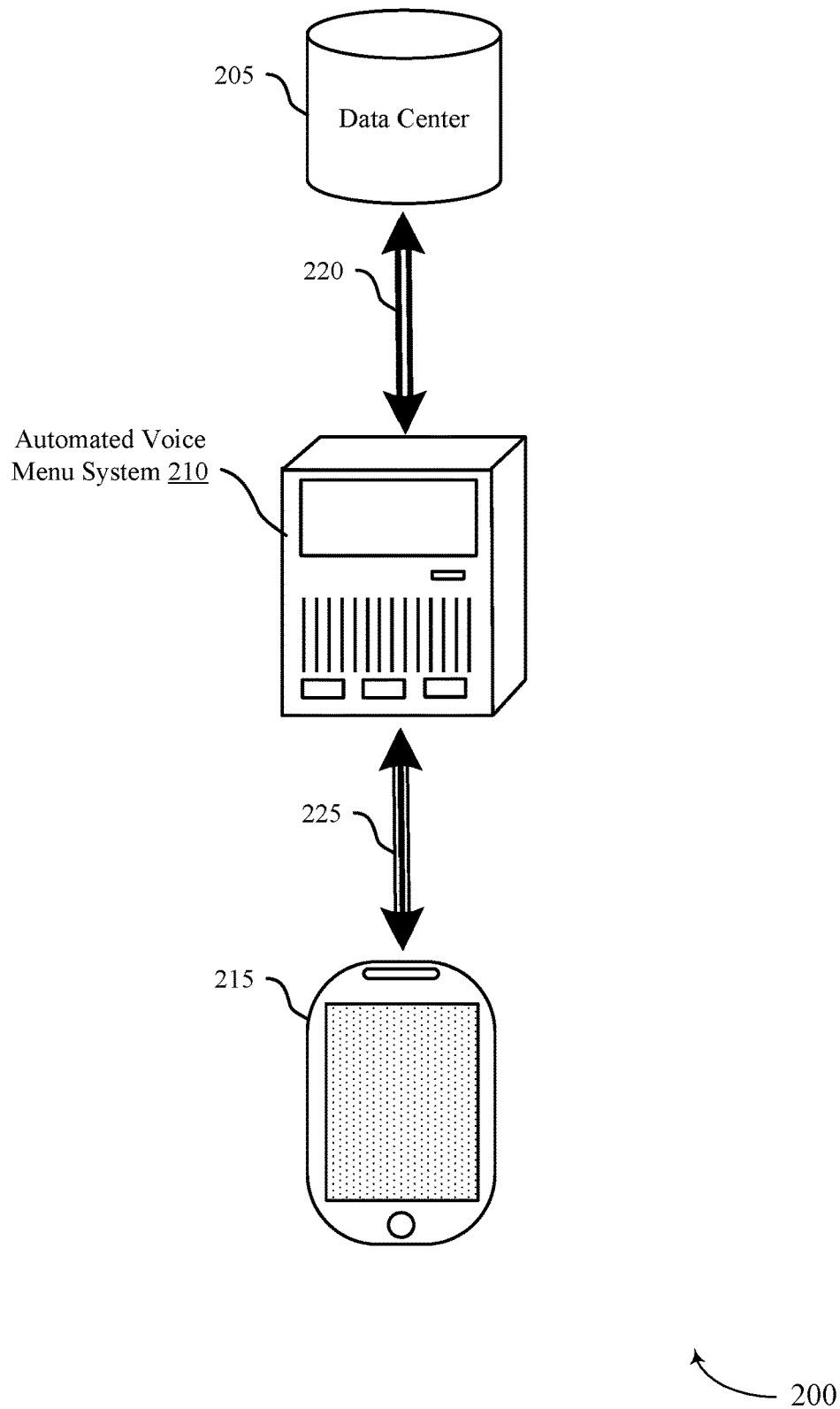
FIG. 2 illustrates an example of a system that supports audio menu navigation and option selection via display device in accordance with aspects of the present disclosure.

FIG. 2 illustrates an example of a system 200 that supports audio menu navigation and option selection via display device in accordance with aspects of the present disclosure. The system 200, which may be an example of a system for communications, includes a data center 205, an automated voice menu system 210, a user device 215, a data center connection 220 extending between the data center 205 and the automated voice menu system 210, and a communication connection 225 extending between the automated voice menu system 210 and the user device 215. The system 200 may implement aspects of the system 100 as described with reference to FIG. 1 to support audio menu navigation and option selection via a display device, such as the user device 215, to facilitate efficiently interacting with an audio menu and navigating through any number of option selections or additional menus. For example, the automated voice menu system 210 may be an example of a single server, a server cluster, a database server, a cloud-based server, a virtual machine, a container, or any other device or system that supports communications.

The automated voice menu system 210 may be a central server that stores at least a portion of the data relevant to the system 200 (i.e., the audio menu in the form of audio feedback or files) and may exchange data with the user device 215 once a communication connection has been established between the automated voice menu system 210 and the user device 215. Additionally, the user device 215 may be an example of a cloud client 105 or a contact 110, and the data center 205 may implement aspects of one or more of the data center 120 or cloud platform 115 as described with reference to FIG. 1, for example.

The data center 205 may store one or more voice menus for access by the automated voice menu system 210 via the data center connection 220. In such cases, the automated voice menu system 210 may request one or more voice menus from the data center 205 in response to one or more of the communication connection 225 being established between the automated voice menu system 210 and the user device 215 or the automated voice menu system 210 receiving an input from the user device 215 via the communication connection 225. In some cases, the automated voice menu system 210 may store the one or more voice menus, including any related data, for communication with the user device 215 via the communication connection 225. Additionally, the user device 215 may present information related to the one or more voice menus generated by the automated voice menu system 210 on a user interface associated with the user device 215. The user device 215 may additionally solicit input from the user regarding selection of one or more elements presented on the user interface, the one or more elements corresponding to one or more option selections generated by the user device and corresponding to options presented by the automated voice menu system in an audible format.

In some cases, the user device 215 may determine the one or more option selections corresponding to the menu of audio options by determining the option selections in real time from the audio feedback. In other cases, the user device 215 may determine the one or more option selections from a memory associated with the system 200, the memory containing a stored record of the previously determined option selections. In such cases, the previously determined option selections may be have been determined by the user device 215 during a previous communication connection with the automated voice menu system 210, or the previously determined option selections may have been determined and stored in the memory by an additional user device 215 not associated with the current user. Additionally, in some cases, the automated voice menu system 210 may determine that the user device 215 is capable of presenting a visual representation of the option selections to the user and may transmit a digital signal to the user device 215 such that the user device 215 may present the determined option selections to the user via the user device 215 substantially simultaneously with the communication connection 225 being established between the user device 215 and the automated voice menu system 210.

Figure 3:
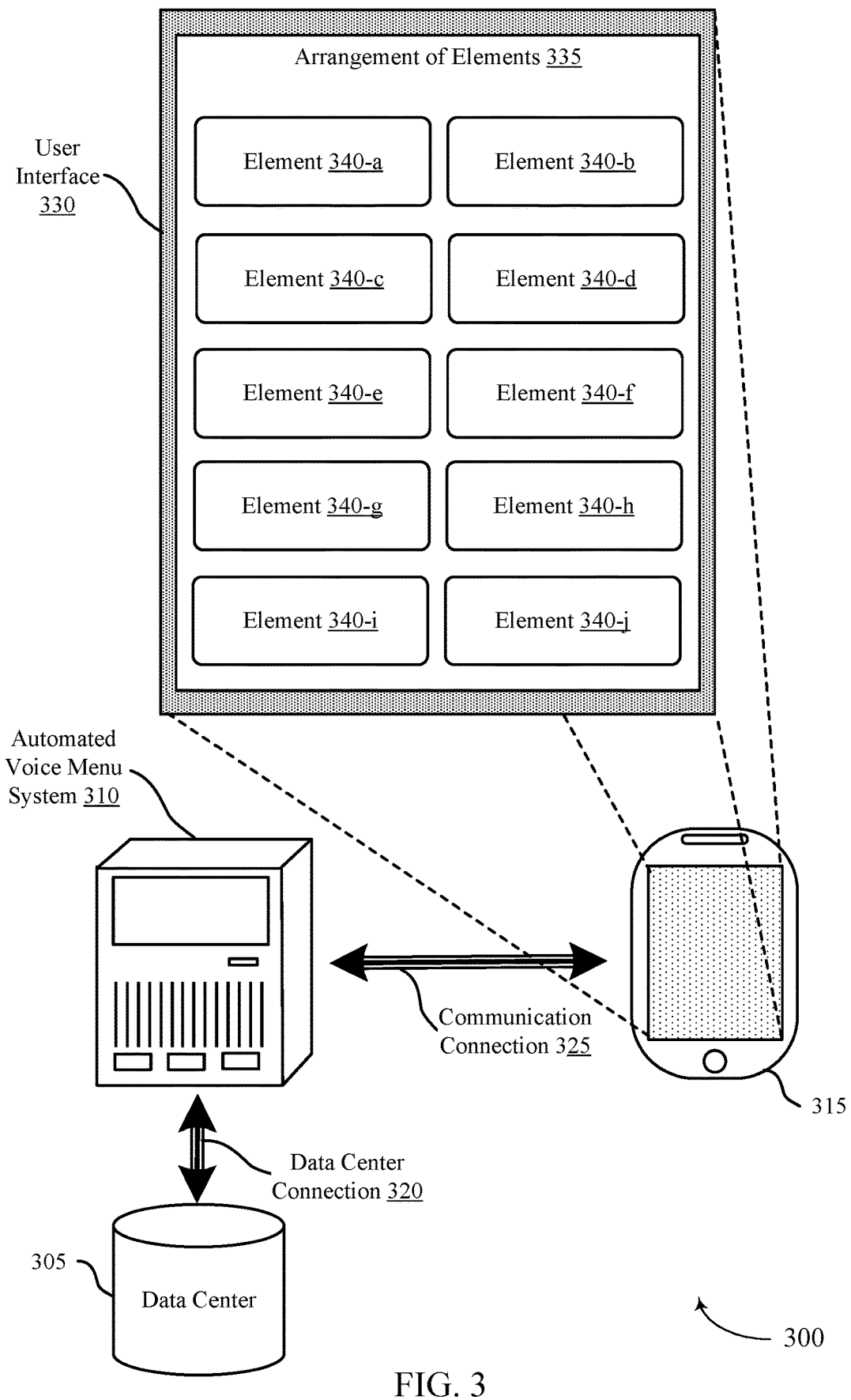
FIG. 3 illustrates an example of a system that supports audio menu navigation and option selection via display device in accordance with aspects of the present disclosure.

FIG. 3 illustrates an example of a system 300 that supports audio menu navigation and option selection via display device in accordance with aspects of the present disclosure. The system 300, which may be an example of a system for communications, includes a data center 305, an automated voice menu system 310, a user device 315, a data center connection 320 extending between the data center 305 and the automated voice menu system 310, and a communication connection 325 extending between the automated voice menu system 310 and the user device 315. The system 300 may implement aspects of systems 100 or 200 as described with reference to FIGS. 1 and 2 to support audio menu navigation and option selection via a display device, such as the user device 315, to facilitate efficiently interacting with an audio menu and navigating through any number of option selections or additional menus. For example, the automated voice menu system 310 may be an example of a single server, a server cluster, a database server, a cloud-based server, a virtual machine, a container, or any other device or system that supports communications.

The automated voice menu system 310 may be a central server that stores at least a portion of the data relevant to the system 300 (i.e., the audio menu in the form of audio feedback or files) and may exchange data with the user device 315 once a communication connection has been established between the automated voice menu system 310 and the user device 315. Additionally, the user device 315 may be an example of a cloud client 105 or a contact 110, and the data center 305 may implement aspects of one or more of the data center 120 or cloud platform 115 as described with reference to FIG. 1, for example.

The data center 305 may store one or more voice menus for access by the automated voice menu system 310 via the data center connection 320. In such cases, the automated voice menu system 310 may request one or more voice menus from the data center 305 in response to one or more of the communication connection 325 being established between the automated voice menu system 310 and the user device 315 or the automated voice menu system 310 receiving an input from the user device 315 via the communication connection 325. In some cases, the automated voice menu system 310 may store the one or more voice menus, including any related data, for communication with the user device 315 via the communication connection 325.

The user device 315 may present information related to the one or more voice menus generated by the automated voice menu system 310 on a user interface 330 associated with the user device 315. The user interface 330 may be generated by the user device 315 based at least in part on one or more option selections that are determined by the user device 315 and that correspond to the menu of options presented by the automated voice menu system 310. The user device 315 may additionally solicit input from the user regarding selection of one or more elements 340 presented on the user interface 330 as part of an arrangement of elements 335, the one or more elements 340 corresponding to one or more option selections generated by the user device 315 that correspond to options presented by the automated voice menu system 310 in an audible format as part of one or more of the voice menus.

The user interface 330 may support audio menu navigation and option selection as described herein. In some cases, the user interface 330 may provide a single view to the user that represents and corresponds to the current voice menu being presented to the user by the automated voice menu system 310 for selection by the user. The user interface 330 includes an arrangement of elements 340 including elements 340-*a*, 340-*b*, 340-*c*, 340-*d*, 340-*e*, 340-*f*, 340-*g*, 340-*h*, 340-*i*, and 340-*j*. In this example, each of the elements 340 corresponds to an option selection determined from a first voice menu by the user device 315. In some cases, the user interface 330 may be a user interface of an application at the user device 315. In such cases, establishing the communication connection 325 with the automated voice menu system 310 may cause the application to open on the user interface 330 of the user device 315 such that the user may review the elements 340 and provide an input to select one or more of the elements 340.

One or more of the elements 340-*a*, 340-*b*, 340-*c*, 340-*d*, 340-*e*, 340-*f*, 340-*g*, 340-*h*, 340-*i*, and 340-*j* may be selected by the user by an input from the user to the user device 315 via the user interface 330. The user may provide the input to the user interface 330 selecting one or more of the elements 340 via a touch input, a voice input, an expression input, a gesture input, or a combination thereof. In such cases where a user has provided a non-touch input, the user device 315 may convert the non-touch input into a corresponding equivalent touch input selecting one or more of the elements 340. In other cases, the user device 315 may convert a non-verbal input from the user into a corresponding verbal input that corresponds to an equivalent verbal input from the user. Additionally, the user device 315 may transmit, based on a reception capability of the automated voice menu system 310, one or both of a verbal response from the user or a non-verbal response from the user that corresponds to one or more of the received touch input, expression input, gesture input, or a combination thereof.

Based on the received response from the user device 315 via the communication connection 325, the automated voice menu system 310 may perform an action corresponding to the input from the user contained within the response. In some cases, based on the received response, the automated voice menu system 310 may connect the user of the user device 315 with an operator or a technician associated with the option selection selected by the user's input selecting one or more of the elements 340. In other cases, based on the received response, the automated voice menu system 310 may progress to a second audio menu and provide audio feedback indicating a second menu of options. In such cases, the user device 315 may determine one or more option selections based on the second menu of options and may present the determined one or more option selections to the user in the form of additional elements 340 via the user interface 330.

Figure 4:
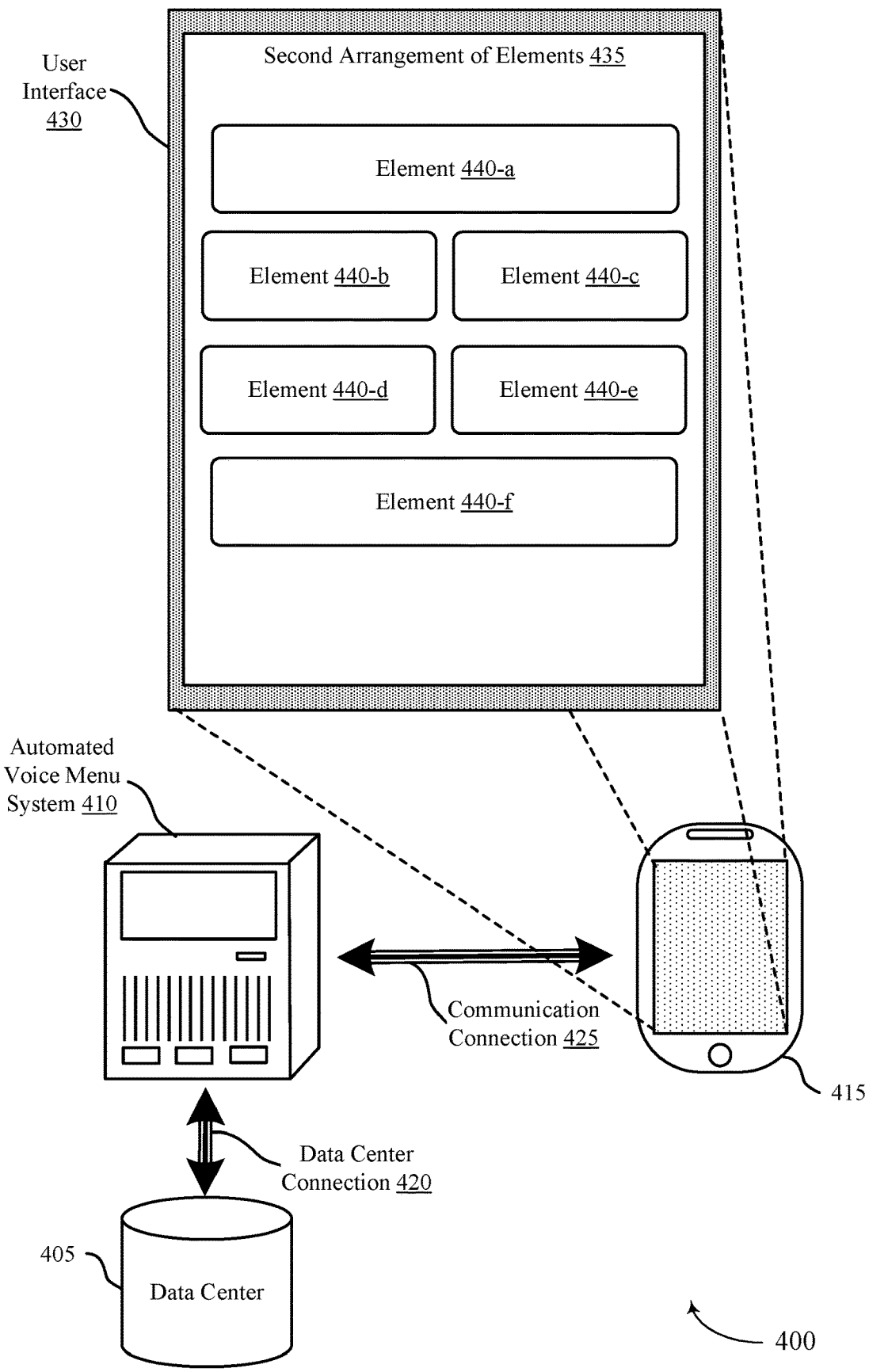
FIG. 4 illustrates an example of a system that supports audio menu navigation and option selection via display device in accordance with aspects of the present disclosure.

FIG. 4 illustrates an example of a system 400 that supports audio menu navigation and option selection via display device in accordance with aspects of the present disclosure. The system 400, which may be an example of a system for communications, includes a data center 405, an automated voice menu system 410, a user device 415, a data center connection 420 extending between the data center 405 and the automated voice menu system 410, and a communication connection 425 extending between the automated voice menu system 410 and the user device 415. The system 400 may implement aspects of systems 100, 200, or 300 as described with reference to FIGS. 1-3 to support audio menu navigation and option selection via a display device, such as the user device 415, to facilitate efficiently interacting with an audio menu and navigating through any number of option selections or additional menus. For example, the automated voice menu system 410 may be an example of a single server, a server cluster, a database server, a cloud-based server, a virtual machine, a container, or any other device or system that supports communications.

The automated voice menu system 410 may be a central server that stores at least a portion of the data relevant to the system 400 (i.e., the audio menu in the form of audio feedback or files) and may exchange data with the user device 415 once a communication connection has been established between the automated voice menu system 410 and the user device 415. Additionally, the user device 415 may be an example of a cloud client 105 or a contact 110, and the data center 405 may implement aspects of one or more of the data center 120 or cloud platform 115 as described with reference to FIG. 1, for example.

The data center 405 may store one or more voice menus for access by the automated voice menu system 410 via the data center connection 420. In such cases, the automated voice menu system 410 may request one or more voice menus from the data center 405 in response to one or more of the communication connection 425 being established between the automated voice menu system 410 and the user device 415 or the automated voice menu system 410 receiving an input from the user device 415 via the communication connection 425. In some cases, the automated voice menu system 410 may store the one or more voice menus, including any related data, for communication with the user device 415 via the communication connection 425.

The user device 415 may present information related to the one or more voice menus generated by the automated voice menu system 410 on a user interface 430 associated with the user device 415. The user interface 430 may be generated by the user device 415 based at least in part on one or more option selections that are determined by the user device 415 and that correspond to the menu of options presented by the automated voice menu system 410. The user device 415 may additionally solicit input from the user regarding selection of one or more elements 440 presented on the user interface 430, the one or more elements 440 corresponding to one or more option selections generated by the user device 415 that correspond to options presented by the automated voice menu system 410 in an audible format as part of one or more of the voice menus.

The user interface 430 may support audio menu navigation and option selection as described herein. In some cases, the user interface 430 may provide a single view to the user that represents and corresponds to the current voice menu being presented to the user by the automated voice menu system 410 for selection by the user. The user interface 430 includes second arrangement of elements 435 including elements 440-a, 440-b, 440-c, 440-d, 440-e, and 440-f. In this example, each of the elements 440 corresponds to an option selection determined from a second voice menu by the user device 415. For example, the second arrangement of elements 435 presented on the user interface 430 may be the result of the user having selected one or more elements, such as the elements 340 of the arrangement of elements 335 described herein with reference to FIG. 3, prior to the user device 415 generating the second arrangement of elements 435. In some cases, the user interface 430 may be a user interface of an application at the user device 415. In such cases, establishing the communication connection with the automated voice menu system 410 may cause the application to open on the user interface 430 of the user device 415 such that the user may review the elements 440 and provide an input to select one or more of the elements 440.

One or more of the elements 440-a, 440-b, 440-c, 440-d, 440-e, and 440-f may be selected by the user by an input from the user to the user device 415 via the user interface 430. The user may provide the input to the user interface 430 selecting one or more of the elements 440 via a touch input, a voice input, an expression input, a gesture input, or a combination thereof. In such cases where a user has provided a non-touch input, the user device 415 may convert the non-touch input into a corresponding equivalent touch input selecting one or more of the elements 440. In other cases, the user device 415 may convert a non-verbal input from the user into a corresponding equivalent verbal input from the user. Additionally, the user device 415 may transmit, based on a reception capability of the automated voice menu system 410, one or both of a verbal response from the user or a non-verbal response from the user that corresponds to one or more of the received touch input, expression input, gesture input, or a combination thereof.

Based on the received response from the user device 415 via the communication connection 425, the automated voice menu system 410 may perform an action corresponding to the input from the user contained within the response. In some cases, based on the received response, the automated voice menu system 410 may connect the user of the user device 415 with an operator or a technician associated with the option selection selected by the user's input selecting one or more of the elements 440. In other cases, based on the received response, the automated voice menu system 410 may progress to an additional audio menu, such as a third or fourth audio menu, and provide audio feedback indicating an additional menu of options. In such cases, the user device 415 may determine one or more option selections based on the additional menu of options and may present the determined one or more option selections to the user in the form of additional elements 440 via the user interface 430.

Figure 5:
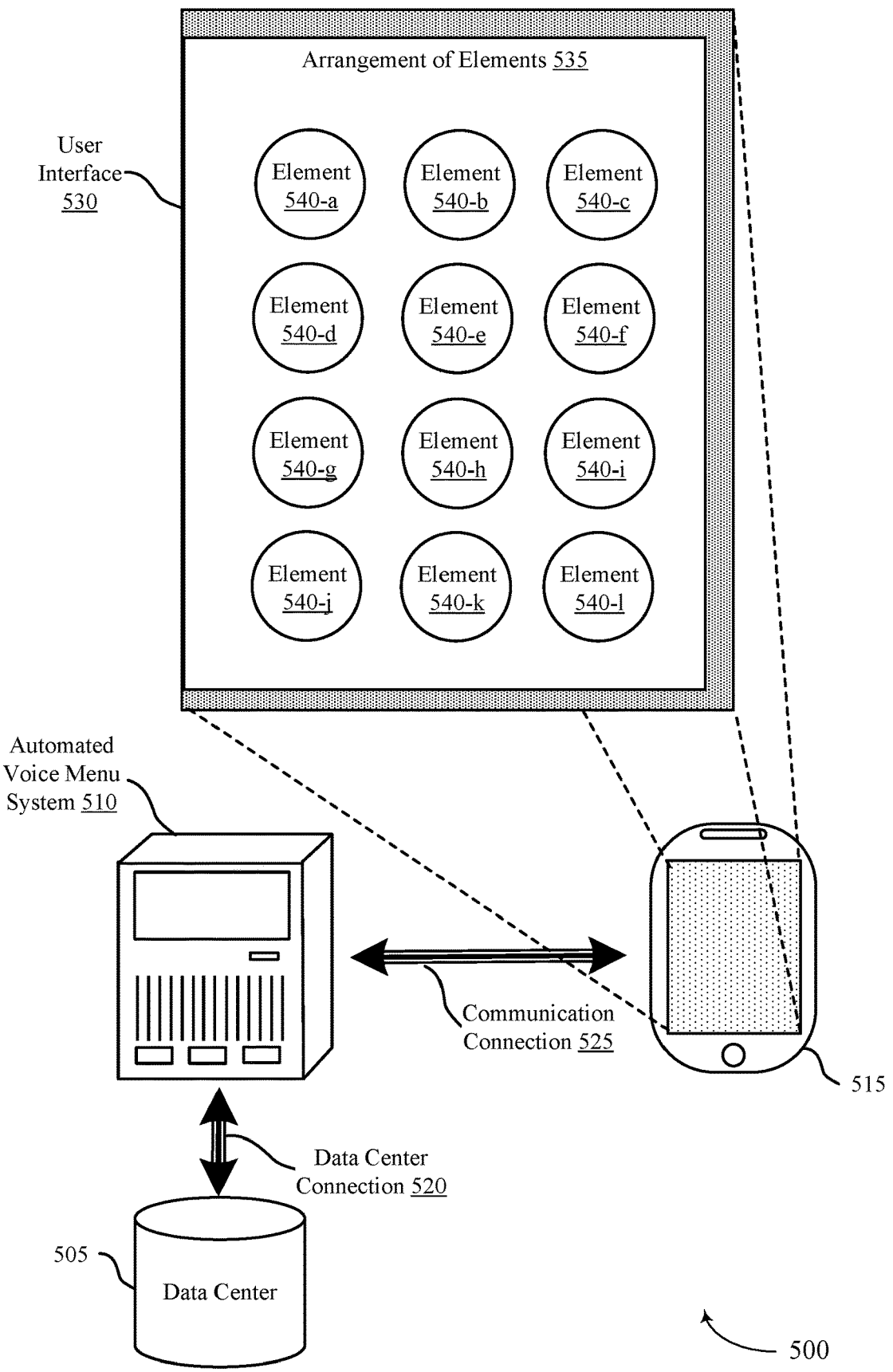
FIG. 5 illustrates an example of a system that supports audio menu navigation and option selection via display device in accordance with aspects of the present disclosure.

FIG. 5 illustrates an example of a system 500 that supports audio menu navigation and option selection via display device in accordance with aspects of the present disclosure. The system 500, which may be an example of a system for communications, includes a data center 505, an automated voice menu system 510, a user device 515, a data center connection 520 extending between the data center 505 and the automated voice menu system 510, and a communication connection 525 extending between the automated voice menu system 510 and the user device 515. The system 500 may implement aspects of systems 100, 200, 300, or 400 as described with reference to FIGS. 1-4 to support audio menu navigation and option selection via a display device, such as the user device 515, to facilitate efficiently interacting with an audio menu and navigating through any number of option selections or additional menus. For example, the automated voice menu system 510 may be an example of a single server, a server cluster, a database server, a cloud-based server, a virtual machine, a container, or any other device or system that supports communications.

The automated voice menu system 510 may be a central server that stores at least a portion of the data relevant to the system 500 (i.e., the audio menu in the form of audio feedback or files) and may exchange data with the user device 515 once a communication connection has been established between the automated voice menu system 510 and the user device 515. Additionally, the user device 515 may be an example of a cloud client 105 or a contact 110, and the data center 505 may implement aspects of one or more of the data center 120 or cloud platform 115 as described with reference to FIG. 1, for example.

The data center 505 may store one or more voice menus for access by the automated voice menu system 510 via the data center connection 520. In such cases, the automated voice menu system 510 may request one or more voice menus from the data center 505 in response to one or more of the communication connection 525 being established between the automated voice menu system 510 and the user device 515 or the automated voice menu system 510 receiving an input from the user device 515 via the communication connection 525. In some cases, the automated voice menu system 510 may store the one or more voice menus, including any related data, for communication with the user device 415 via the communication connection 525.

The user device 515 may present information related to the one or more voice menus generated by the automated voice menu system 510 on a user interface 530 associated with the user device 515. The user interface 530 may be generated by the user device 515 based at least in part on one or more option selections that are determined by the user device 515 and that correspond to the menu of options presented by the automated voice menu system 510. The user device 515 may additionally solicit input from the user regarding selection of one or more elements 540 presented on the user interface 530, the one or more elements 540 corresponding to one or more option selections generated by the user device 515 that correspond to options presented by the automated voice menu system 510 in an audible format as part of one or more of the voice menus.

The user interface 530 may support audio menu navigation and option selection as described herein. In some cases, the user interface 530 may provide a single view to the user that represents and corresponds to the current voice menu being presented to the user by the automated voice menu system 510 for selection by the user. The user interface 530 includes the arrangement of elements 535 including elements 540-a, 540-b, 540-c, 540-d, 540-e, 540-f, 540-g, 540-g, 540-h, 540-i, 540-j, 540-k, and 540-l. In this example, each of the elements 540 corresponds to an option selection determined from a voice menu by the user device 515. Additionally, each of the elements 540 has been generated at the user interface 530 to replace a number or a symbol of a standard twelve element dial pad that was interacted with by the user to cause the user device 515 to establish the communication connection 525 between the user device 515 and the automated voice menu system 510.

For example, a user may input (i.e., dial) a number associated with the voice menu system at the user interface 530 via a dial pad present at the user interface 530, causing the user device 510 to initiate and establish the communication connection 525 between the user device 515 and the automated voice menu system 510. Upon establishing the communication connection, and after the user device 515 has determined the option selections from the audio feedback generated by the automated voice menu system 510, one or more of the elements that were present on the user interface 530 may be replaced by one or more of the elements 540. In some cases, the user interface 530 may be a user interface of an application at the user device 515. In such cases, establishing the communication connection with the automated voice menu system 510 may cause the application to open on the user interface 530 of the user device 515 in a visual representation of the elements formerly displaying numbers or symbols as part of a dial pad of the user device 515 such that the user may review the elements 540 and provide an input to select one or more of the elements 540.

One or more of the elements 540-a, 540-b, 540-c, 540-d, 540-e, 540-f, 540-g, 540-g, 540-h, 540-i, 540-j, 540-k, and 540-l may be selected by the user by an input from the user to the user device 515 via the user interface 530. The user may provide the input to the user interface 530 selecting one or more of the elements 540 via a touch input, a voice input, an expression input, a gesture input, or a combination thereof. In such cases where a user has provided a non-touch input, the user device 515 may convert the non-touch input into a corresponding equivalent touch input selecting one or more of the elements 540. In other cases, the user device 515 may convert a non-verbal input from the user into a corresponding equivalent verbal input from the user. Additionally, the user device 515 may transmit, based on a reception capability of the automated voice menu system 510, one or both of a verbal response from the user or a non-verbal response from the user that corresponds to one or more of the received touch input, expression input, gesture input, or a combination thereof.

Based on the received response from the user device 515 via the communication connection 525, the automated voice menu system 510 may perform an action corresponding to the input from the user contained within the response. In some cases, based on the received response, the automated voice menu system 510 may connect the user of the user device 515 with an operator or a technician associated with the option selection selected by the user's input selecting one or more of the elements 540. In other cases, based on the received response, the automated voice menu system 510 may progress to an additional audio menu, such as a third or fourth audio menu, and provide audio feedback indicating an additional menu of options. In such cases, the user device 515 may determine one or more option selections based on the additional menu of options and may present the determined one or more option selections to the user in the form of additional elements 540 arranged to imitate the dial pad of the user device 515 via the user interface 530.

Figure 6:
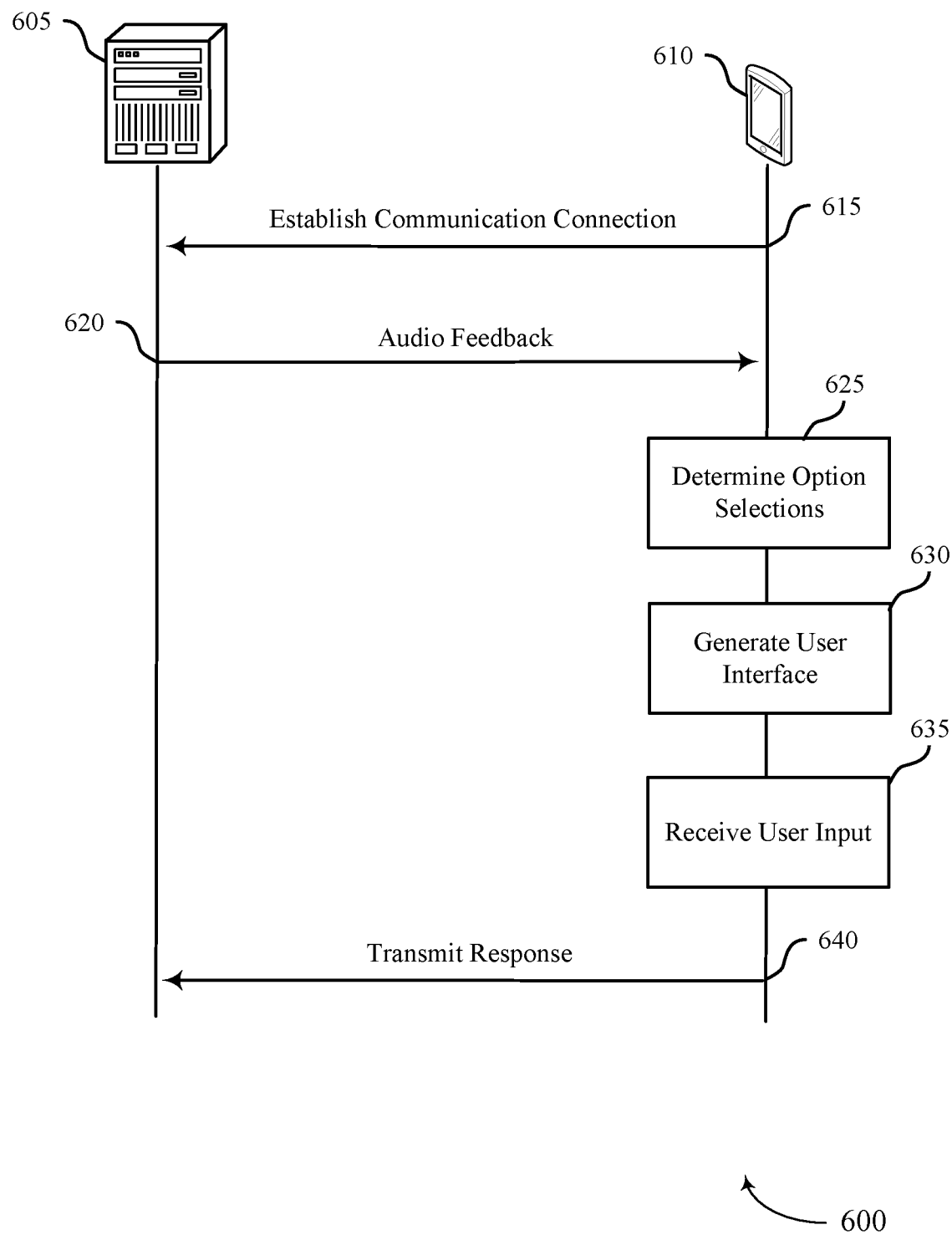
FIG. 6 illustrates an example of a process flow that supports audio menu navigation and option selection via display device in accordance with aspects of the present disclosure.

FIG. 6 illustrates an example of a system 600 that supports audio menu navigation and option selection via display device in accordance with aspects of the present disclosure. The process flow 600 includes an automated voice menu system 605 and a user device 610. These may be examples of the corresponding devices described with reference to FIGS. 1 through 5. Alternative examples of the following may be implemented, where some steps are performed in a different order than described, or not performed at all. In some cases, steps may include additional features not mentioned below, or further steps may be added.

At 615, a communication connection may be established between the automated voice menu system 605 and the user device 610. Establishment of the communication connection between the automated voice menu system 605 and the user device 610 may be initiated by the user device 610. In some cases, the communication connection between the automated voice menu system 605 and the user device 610 may be initiated by the automated voice menu system 605 or some other component of the process flow 600.

At 620, the automated voice menu system 605 may transmit audio feedback to the user device 610 in response to the communication connection being established between the automated voice menu system 605 and the user device 610. The audio feedback generated by the automated voice menu system 605 may indicate a menu of options in response to the communication connection being established between the automated voice menu system 605 and the user device 610.

At 625, the user device 610 may determine one or more option selections corresponding to the menu of options. The user device 610 may determine the one or more option selections corresponding to the menu of options by analyzing the received audio feedback from the automated voice menu system 605. In some cases, the audio feedback received from the user device may include audio signals corresponding to the determined one or more option selections.

At 630, the user device 610 may generate a user interface at the user device 610. The user interface may be generated based at least in part on the determined one or more option selections. The user interface may include an arrangement of elements corresponding to one or more of the determined one or more option selections. In some cases, the user device 610 may generate the user interface by replacing one or more numbers of a keypad display presented on the user interface with corresponding elements of the arrangement of elements. In some cases, generating the user interface at the user device 610 may include opening an application for display on the user device 610.

At 635, an input from a user may be received by the user device 610 via the user interface. The received input may select one or more of the elements corresponding to a subset of the determined one or more option selections.

In some cases, the input received from the user at the user device 610 may cause the user interface to display a second arrangement of elements that correspond to an additional one or more determined one or more option selections. In some cases, the input received from the user at the user device 610 may include one of a voice input, an expression input, or a combination thereof.

At 640, the user device 610 may transmit a response, via the communication connection, to the automated voice menu system 605. The response may be based at least in part on the received input from the user, wherein the response is responsive to the audio feedback and indicates a selection of the subset of the determined one or more option selections.

In some cases, the user device 610 may transmit a capability message to the automated voice menu system. The capability message may indicate a capability to generate the user interface at the user device 610 the includes the arrangement of elements that correspond to the determined one or more option selections. In some cases, the user device 610 may transmit the response to the automated voice menu system 605 based on the reception capability of the automated voice menu system 605. In such cases, the user device 610 may transmit one or both of a verbal response from the user or a non-verbal response corresponding to the one of the touch input, the expression input, or a combination thereof. Further, in such cases, the user device 610 may convert the verbal response from the user into a non-verbal response that corresponds to the verbal response received from the user.

In some cases, the determined one or more option selections corresponding to the menu of options associated with the automated voice menu system may be stored by one or more components of the process flow 600. In some cases, the user device 610 may store the one or more option selections. In other cases, the automated voice menu system 605 may store the one or more option selections for use when contacted by the user device 610 an additional time. In some cases, the stored determined one or more option selections associated with the automated voice menu system 605 may be shared with one or more additional user devices 610.

Figure 7:
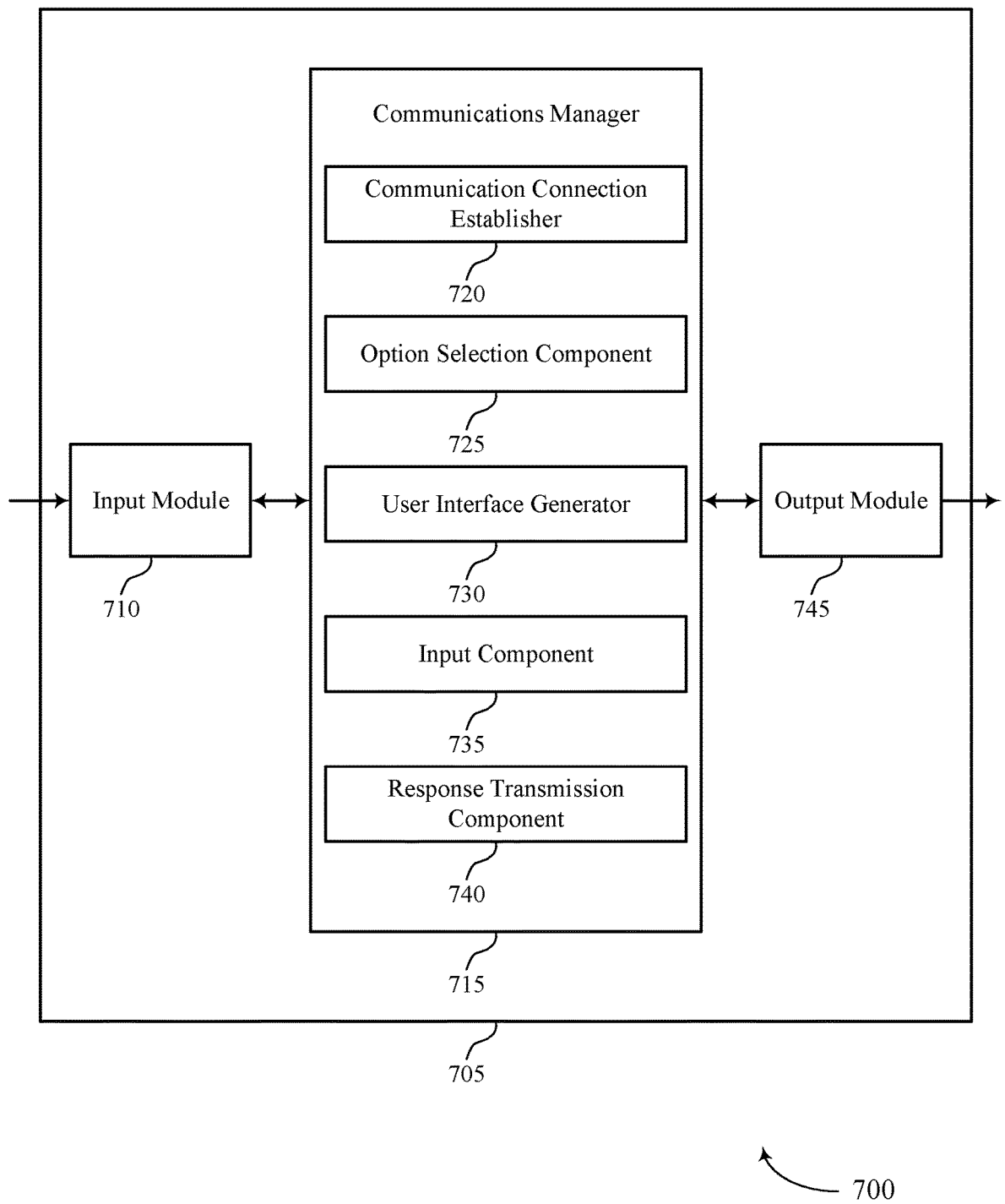
FIG. 7 shows a block diagram of an apparatus that supports audio menu navigation and option selection via display device in accordance with aspects of the present disclosure.

FIG. 7 shows a block diagram 700 of an apparatus 705 that supports audio menu navigation and option selection via display device in accordance with aspects of the present disclosure. The apparatus 705 may include an input module 710, a communications manager 715, and an output module 745. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the communications manager 715 to support AUDIO MENU NAVIGATION AND OPTION SELECTION VIA DISPLAY DEVICE. In some cases, the input module 710 may be a component of an input/output (I/O) controller 915 as described with reference to FIG. 9.

The communications manager 715 may include a communication connection establisher 720, an option selection component 725, an user interface generator 730, an input component 735, and a response transmission component 740. The communications manager 715 may be an example of aspects of the communications manager 805 or 910 described with reference to FIGS. 8 and 9.

The communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, the communications manager 715 and/or at least some of its various sub-components may be a separate and distinct component in accordance with various aspects of the present disclosure. In other examples, the communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The communication connection establisher 720 may establish a communication connection between an automated voice menu system and a user device, where the automated voice menu system is configured to generate audio feedback indicating a menu of options in response to the communication connection being established between the automated voice menu system and the user device.

The option selection component 725 may determine one or more option selections corresponding to the menu of options.

The user interface generator 730 may generate, based on the determined one or more option selections, a user interface at the user device, where the user interface includes an arrangement of elements corresponding to one or more of the determined one or more option selections.

The input component 735 may receive an input from a user via the user interface, the input selecting one or more of the elements corresponding to a subset of the determined one or more option selections.

The response transmission component 740 may transmit a response, via the communication connection, from the user device to the automated voice menu system based on the received input from the user, where the response is responsive to the audio feedback and indicates a selection of the subset of the determined one or more option selections.

The output module 745 may manage output signals for the apparatus 705. For example, the output module 745 may receive signals from other components of the apparatus 705, such as the communications manager 715, and may transmit these signals to other components or devices. In some specific examples, the output module 745 may transmit output signals for display in a user interface, for storage in a database or data store, for further processing at a server or server cluster, or for any other processes at any number of devices or systems. In some cases, the output module 745 may be a component of an I/O controller 915 as described with reference to FIG. 9.

Figure 8:
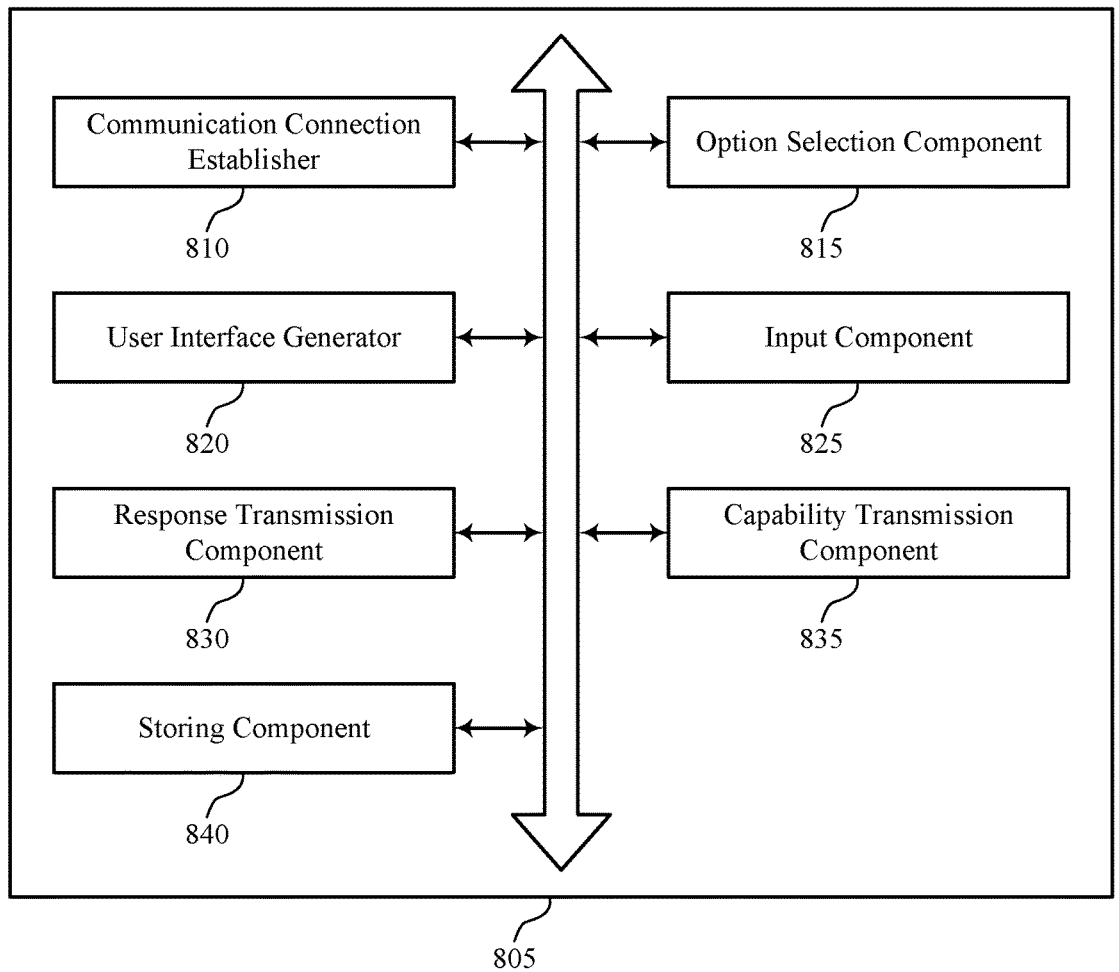
FIG. 8 shows a block diagram of a communications manager that supports audio menu navigation and option selection via display device in accordance with aspects of the present disclosure.

FIG. 8 shows a block diagram 800 of a communications manager 805 that supports audio menu navigation and option selection via display device in accordance with aspects of the present disclosure. The communications manager 805 may be an example of aspects of a communications manager 715 or a communications manager 910 described herein. The communications manager 805 may include a communication connection establisher 810, an option selection component 815, an user interface generator 820, an input component 825, a response transmission component 830, a capability transmission component 835, and a storing component 840. Each of these modules may communicate, directly or indirectly, with one another (e.g., via one or more buses).

The communication connection establisher 810 may establish a communication connection between an automated voice menu system and a user device, where the automated voice menu system is configured to generate audio feedback indicating a menu of options in response to the communication connection being established between the automated voice menu system and the user device.

The option selection component 815 may determine one or more option selections corresponding to the menu of options.

The user interface generator 820 may generate, based on the determined one or more option selections, a user interface at the user device, where the user interface includes an arrangement of elements corresponding to one or more of the determined one or more option selections.

In some examples, the user interface generator 820 may replace one or more numbers of a keypad display with corresponding elements of the arrangement of elements.

In some examples, the user interface generator 820 may open an application for display on the user device.

The input component 825 may receive an input from a user via the user interface, the input selecting one or more of the elements corresponding to a subset of the determined one or more option selections.

In some examples, the input component 825 may receive the input from the user via the user interface causes the user interface to display a second arrangement of elements corresponding to an additional one or more determined one or more option selections.

In some examples, receiving the input from the user includes receiving one of a touch input, a voice input, an expression input, or a combination thereof.

The response transmission component 830 may transmit a response, via the communication connection, from the user device to the automated voice menu system based on the received input from the user, where the response is responsive to the audio feedback and indicates a selection of the subset of the determined one or more option selections.

The capability transmission component 835 may transmit, to the automated voice menu system, a capability message indicating a capability to generate the user interface at the user device including the arrangement of elements corresponding to the determined one or more option selections.

The storing component 840 may store the determined one or more option selections corresponding to the menu of options associated with the automated voice menu system.

Figure 9:
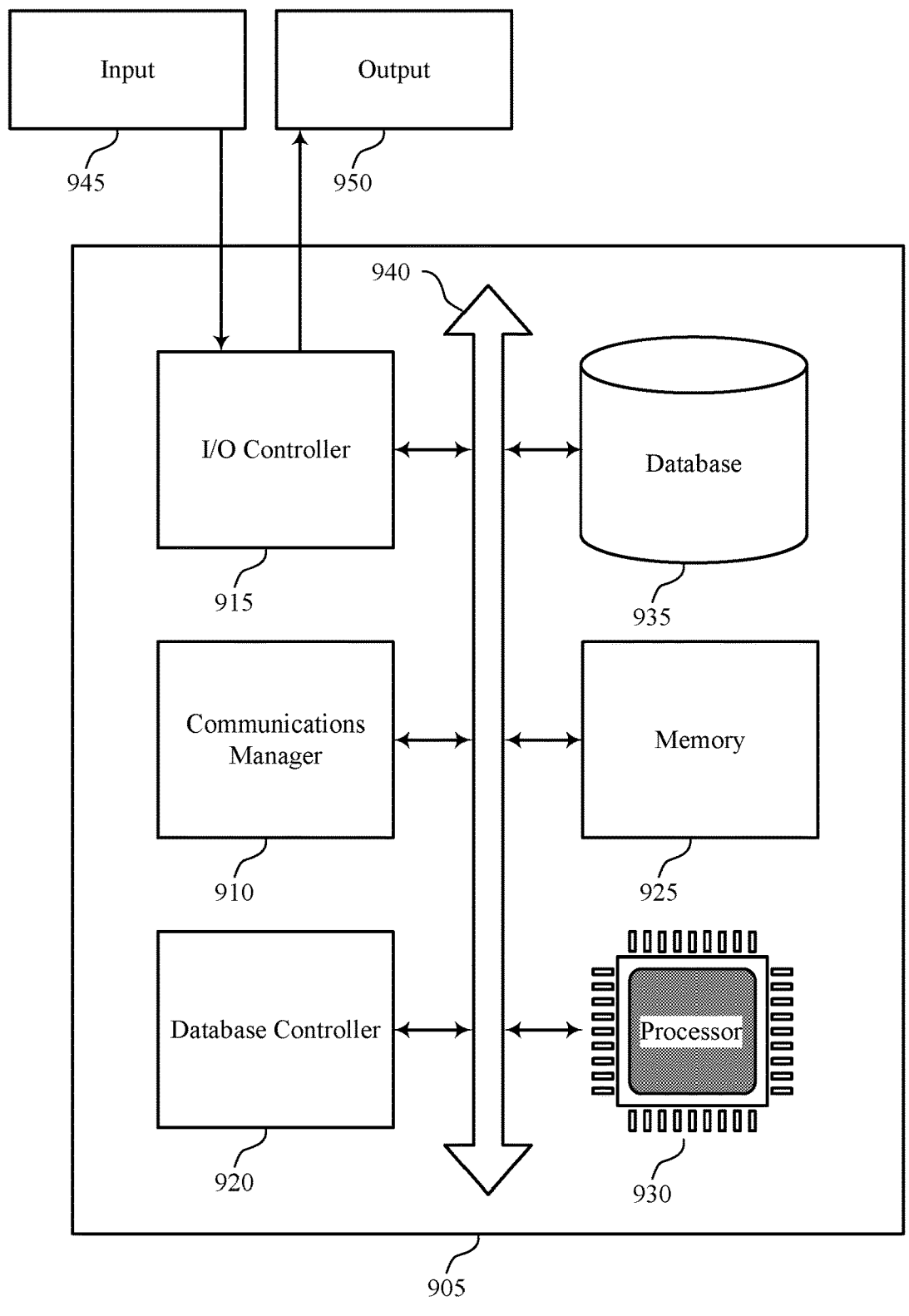
FIG. 9 shows a diagram of a system including a device that supports audio menu navigation and option selection via display device in accordance with aspects of the present disclosure.

FIG. 9 shows a diagram of a system 900 including a device 905 that supports audio menu navigation and option selection via display device in accordance with aspects of the present disclosure. The device 905 may be an example of or include the components of a user device or an apparatus 705 as described herein. The device 905 may include components for bi-directional data communications including components for transmitting and receiving communications, including a communications manager 910, an I/O controller 915, a database controller 920, memory 925, a processor 930, and a database 935. These components may be in electronic communication via one or more buses (e.g., bus 940).

The communications manager 910 may be an example of a communications manager 715 or 805 as described herein. For example, the communications manager 910 may perform any of the methods or processes described above with reference to FIGS. 7 and 8. In some cases, the communications manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting audio menu navigation and option selection via display device).

Figure 10:
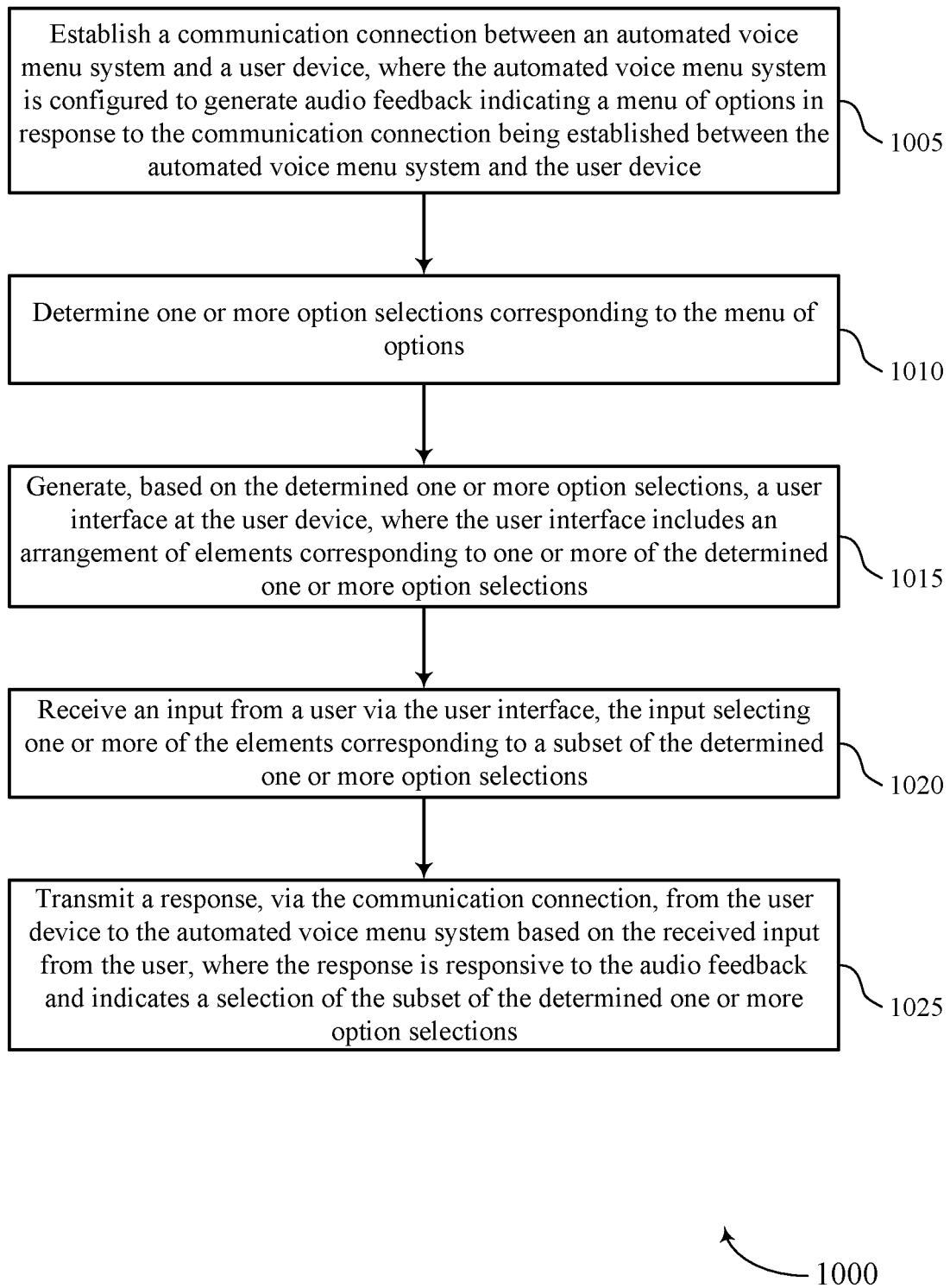
FIGS. 10 through 16 show flowcharts illustrating methods that support audio menu navigation and option selection via display device in accordance with aspects of the present disclosure.

FIG. 10 shows a flowchart illustrating a method 1000 that supports audio menu navigation and option selection via display device in accordance with aspects of the present disclosure. The operations of method 1000 may be implemented by a user device or its components as described herein. For example, the operations of method 1000 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1005, the user device may establish a communication connection between an automated voice menu system and a user device, where the automated voice menu system is configured to generate audio feedback indicating a menu of options in response to the communication connection being established between the automated voice menu system and the user device. The operations of 1005 may be performed according to the methods described herein. In some examples, aspects of the operations of 1005 may be performed by a communication connection establisher as described with reference to FIGS. 7 through 9.

At 1010, the user device may determine one or more option selections corresponding to the menu of options. The operations of 1010 may be performed according to the methods described herein. In some examples, aspects of the operations of 1010 may be performed by an option selection component as described with reference to FIGS. 7 through 9.

At 1015, the user device may generate, based on the determined one or more option selections, a user interface at the user device, where the user interface includes an arrangement of elements corresponding to one or more of the determined one or more option selections. The operations of 1015 may be performed according to the methods described herein. In some examples, aspects of the operations of 1015 may be performed by an user interface generator as described with reference to FIGS. 7 through 9.

At 1020, the user device may receive an input from a user via the user interface, the input selecting one or more of the elements corresponding to a subset of the determined one or more option selections. The operations of 1020 may be performed according to the methods described herein. In some examples, aspects of the operations of 1020 may be performed by an input component as described with reference to FIGS. 7 through 9.

At 1025, the user device may transmit a response, via the communication connection, from the user device to the automated voice menu system based on the received input from the user, where the response is responsive to the audio feedback and indicates a selection of the subset of the determined one or more option selections. The operations of 1025 may be performed according to the methods described herein. In some examples, aspects of the operations of 1025 may be performed by a response transmission component as described with reference to FIGS. 7 through 9.

Figure 11:
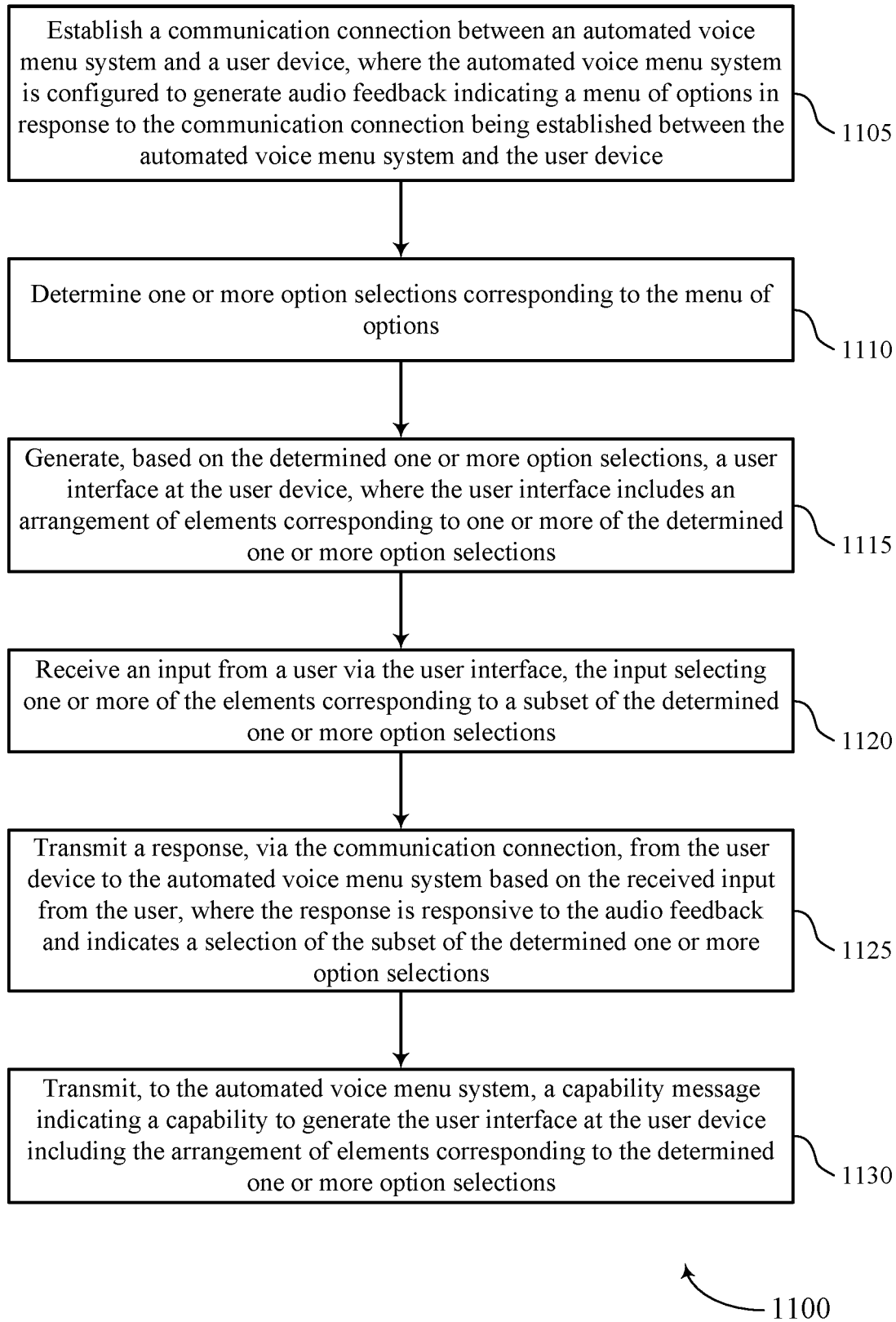

FIG. 11 shows a flowchart illustrating a method 1100 that supports audio menu navigation and option selection via display device in accordance with aspects of the present disclosure. The operations of method 1100 may be implemented by a user device or its components as described herein. For example, the operations of method 1100 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1105, the user device may establish a communication connection between an automated voice menu system and a user device, where the automated voice menu system is configured to generate audio feedback indicating a menu of options in response to the communication connection being established between the automated voice menu system and the user device. The operations of 1105 may be performed according to the methods described herein. In some examples, aspects of the operations of 1105 may be performed by a communication connection establisher as described with reference to FIGS. 7 through 9.

At 1110, the user device may determine one or more option selections corresponding to the menu of options. The operations of 1110 may be performed according to the methods described herein. In some examples, aspects of the operations of 1110 may be performed by an option selection component as described with reference to FIGS. 7 through 9.

At 1115, the user device may generate, based on the determined one or more option selections, a user interface at the user device, where the user interface includes an arrangement of elements corresponding to one or more of the determined one or more option selections. The operations of 1115 may be performed according to the methods described herein. In some examples, aspects of the operations of 1115 may be performed by an user interface generator as described with reference to FIGS. 7 through 9.

At 1120, the user device may receive an input from a user via the user interface, the input selecting one or more of the elements corresponding to a subset of the determined one or more option selections. The operations of 1120 may be performed according to the methods described herein. In some examples, aspects of the operations of 1120 may be performed by an input component as described with reference to FIGS. 7 through 9.

At 1125, the user device may transmit a response, via the communication connection, from the user device to the automated voice menu system based on the received input from the user, where the response is responsive to the audio feedback and indicates a selection of the subset of the determined one or more option selections. The operations of 1125 may be performed according to the methods described herein. In some examples, aspects of the operations of 1125 may be performed by a response transmission component as described with reference to FIGS. 7 through 9.

At 1130, the user device may transmit, to the automated voice menu system, a capability message indicating a capability to generate the user interface at the user device including the arrangement of elements corresponding to the determined one or more option selections. The operations of 1130 may be performed according to the methods described herein. In some examples, aspects of the operations of 1130 may be performed by a capability transmission component as described with reference to FIGS. 7 through 9.

Figure 12:
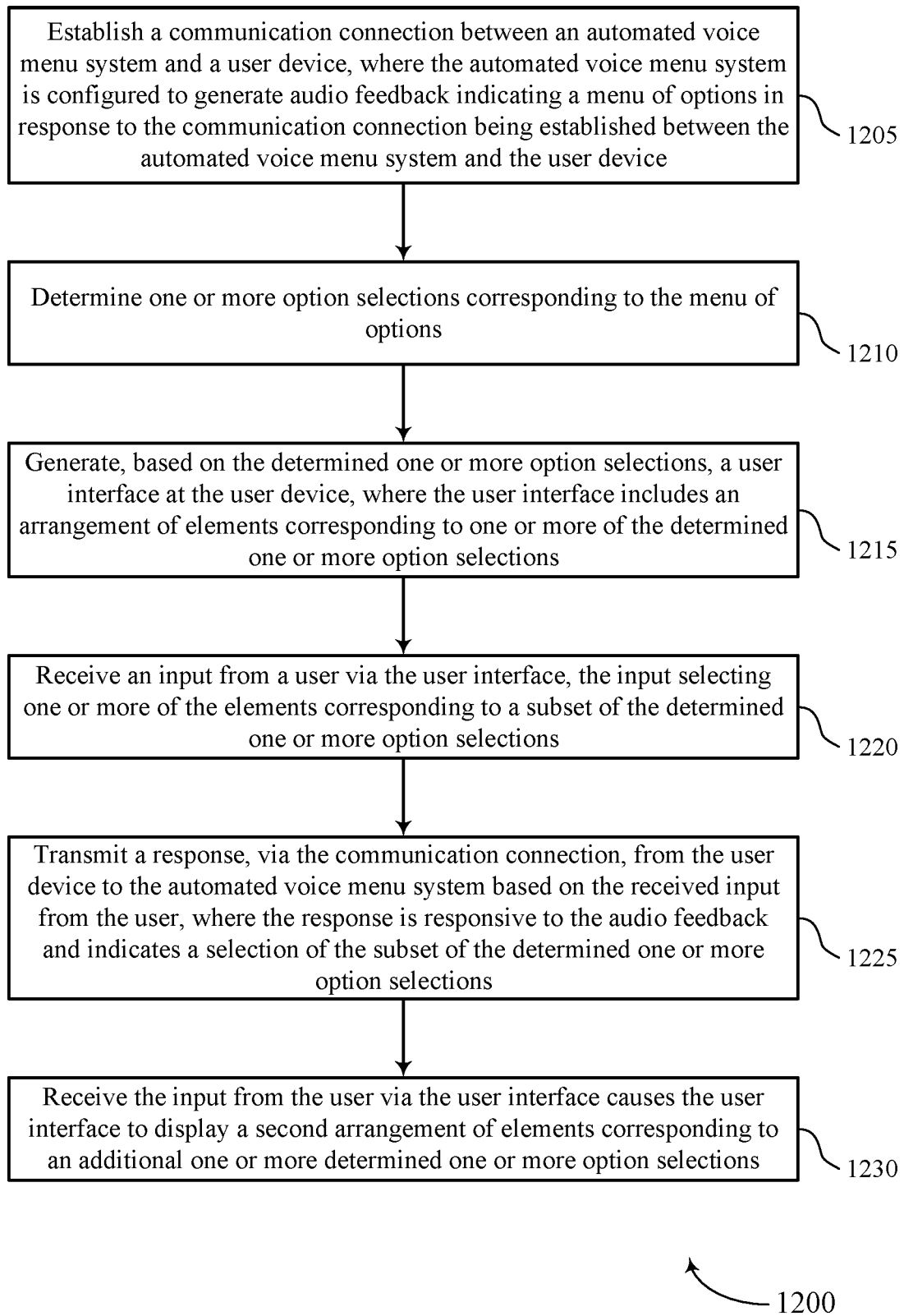

FIG. 12 shows a flowchart illustrating a method 1200 that supports audio menu navigation and option selection via display device in accordance with aspects of the present disclosure. The operations of method 1200 may be implemented by a user device or its components as described herein. For example, the operations of method 1200 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1205, the user device may establish a communication connection between an automated voice menu system and a user device, where the automated voice menu system is configured to generate audio feedback indicating a menu of options in response to the communication connection being established between the automated voice menu system and the user device. The operations of 1205 may be performed according to the methods described herein. In some examples, aspects of the operations of 1205 may be performed by a communication connection establisher as described with reference to FIGS. 7 through 9.

At 1210, the user device may determine one or more option selections corresponding to the menu of options. The operations of 1210 may be performed according to the methods described herein. In some examples, aspects of the operations of 1210 may be performed by an option selection component as described with reference to FIGS. 7 through 9.

At 1215, the user device may generate, based on the determined one or more option selections, a user interface at the user device, where the user interface includes an arrangement of elements corresponding to one or more of the determined one or more option selections. The operations of 1215 may be performed according to the methods described herein. In some examples, aspects of the operations of 1215 may be performed by an user interface generator as described with reference to FIGS. 7 through 9.

At 1220, the user device may receive an input from a user via the user interface, the input selecting one or more of the elements corresponding to a subset of the determined one or more option selections. The operations of 1220 may be performed according to the methods described herein. In some examples, aspects of the operations of 1220 may be performed by an input component as described with reference to FIGS. 7 through 9.

At 1225, the user device may transmit a response, via the communication connection, from the user device to the automated voice menu system based on the received input from the user, where the response is responsive to the audio feedback and indicates a selection of the subset of the determined one or more option selections. The operations of 1225 may be performed according to the methods described herein. In some examples, aspects of the operations of 1225 may be performed by a response transmission component as described with reference to FIGS. 7 through 9.

At 1230, the user device may receive the input from the user via the user interface causes the user interface to display a second arrangement of elements corresponding to an additional one or more determined one or more option selections. The operations of 1230 may be performed according to the methods described herein. In some examples, aspects of the operations of 1230 may be performed by an input component as described with reference to FIGS. 7 through 9.

Figure 13:
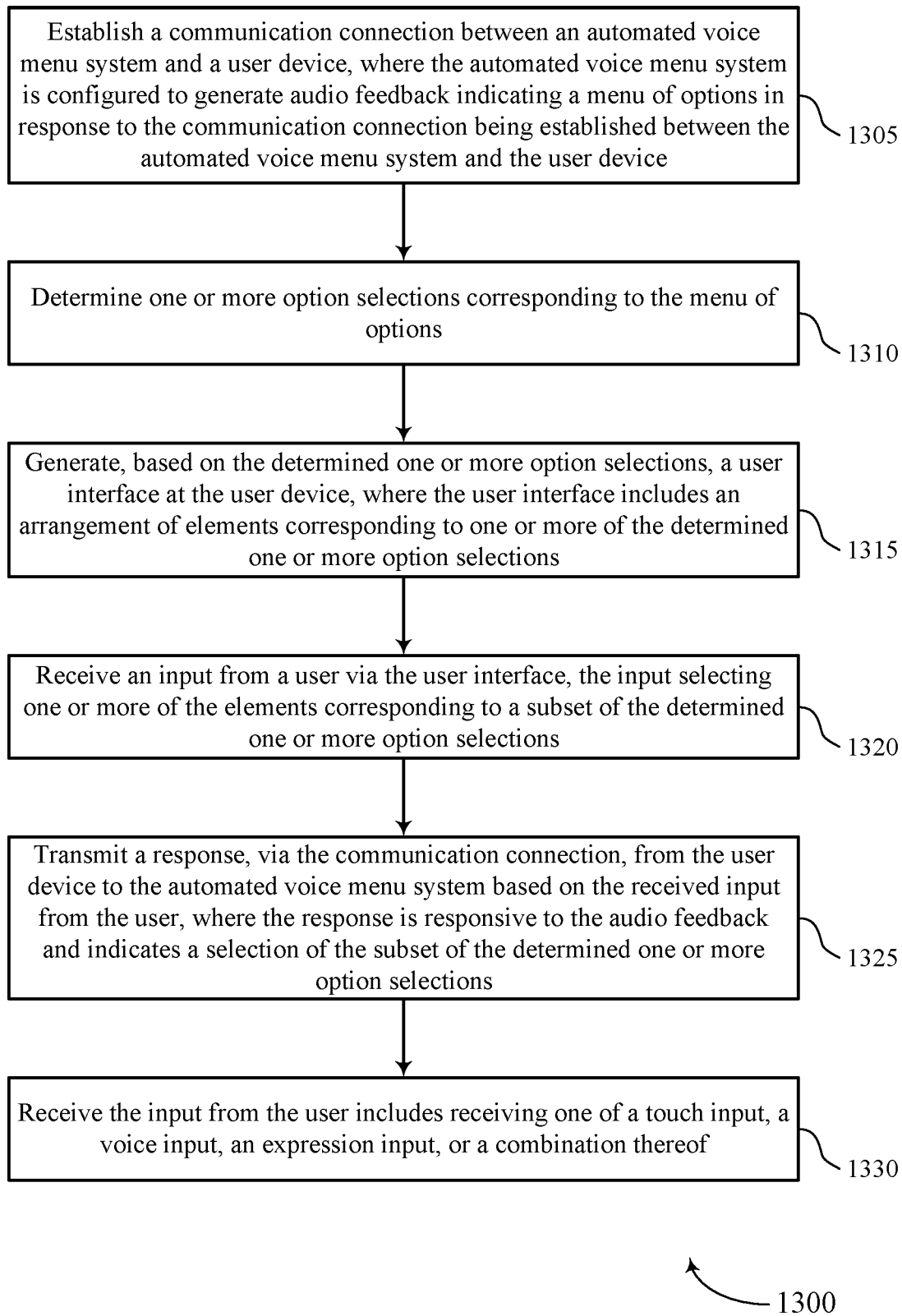

FIG. 13 shows a flowchart illustrating a method 1300 that supports audio menu navigation and option selection via display device in accordance with aspects of the present disclosure. The operations of method 1300 may be implemented by a user device or its components as described herein. For example, the operations of method 1300 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1305, the user device may establish a communication connection between an automated voice menu system and a user device, where the automated voice menu system is configured to generate audio feedback indicating a menu of options in response to the communication connection being established between the automated voice menu system and the user device. The operations of 1305 may be performed according to the methods described herein. In some examples, aspects of the operations of 1305 may be performed by a communication connection establisher as described with reference to FIGS. 7 through 9.

At 1310, the user device may determine one or more option selections corresponding to the menu of options. The operations of 1310 may be performed according to the methods described herein. In some examples, aspects of the operations of 1310 may be performed by an option selection component as described with reference to FIGS. 7 through 9.

At 1315, the user device may generate, based on the determined one or more option selections, a user interface at the user device, where the user interface includes an arrangement of elements corresponding to one or more of the determined one or more option selections. The operations of 1315 may be performed according to the methods described herein. In some examples, aspects of the operations of 1315 may be performed by an user interface generator as described with reference to FIGS. 7 through 9.

At 1320, the user device may receive an input from a user via the user interface, the input selecting one or more of the elements corresponding to a subset of the determined one or more option selections. The operations of 1320 may be performed according to the methods described herein. In some examples, aspects of the operations of 1320 may be performed by an input component as described with reference to FIGS. 7 through 9.

At 1325, the user device may transmit a response, via the communication connection, from the user device to the automated voice menu system based on the received input from the user, where the response is responsive to the audio feedback and indicates a selection of the subset of the determined one or more option selections. The operations of 1325 may be performed according to the methods described herein. In some examples, aspects of the operations of 1325 may be performed by a response transmission component as described with reference to FIGS. 7 through 9.

At 1330, the user device may receive the input from the user includes receiving one of a touch input, a voice input, an expression input, or a combination thereof. The operations of 1330 may be performed according to the methods described herein. In some examples, aspects of the operations of 1330 may be performed by an input component as described with reference to FIGS. 7 through 9.

Figure 14:
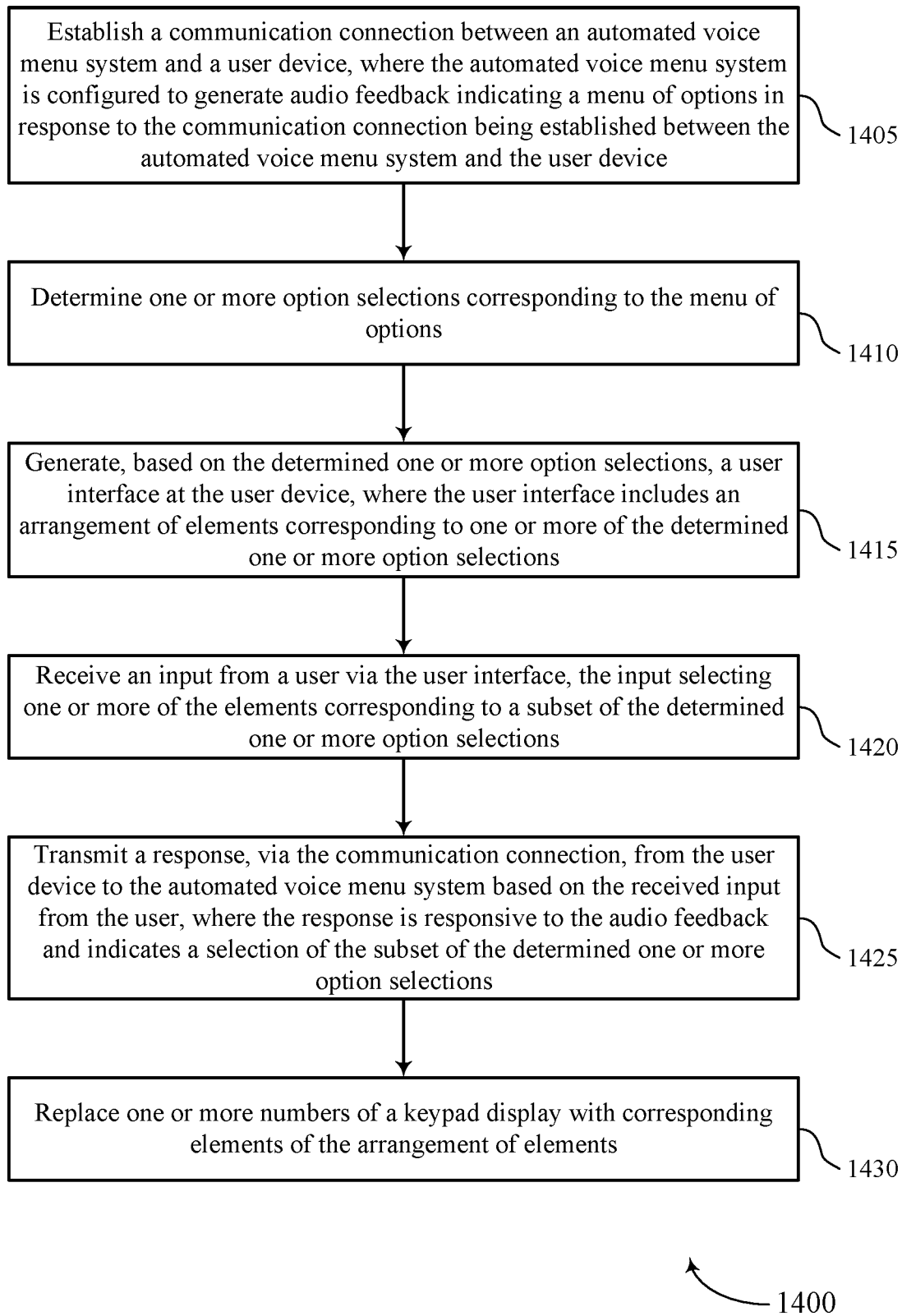

FIG. 14 shows a flowchart illustrating a method 1400 that supports audio menu navigation and option selection via display device in accordance with aspects of the present disclosure. The operations of method 1400 may be implemented by a user device or its components as described herein. For example, the operations of method 1400 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1405, the user device may establish a communication connection between an automated voice menu system and a user device, where the automated voice menu system is configured to generate audio feedback indicating a menu of options in response to the communication connection being established between the automated voice menu system and the user device. The operations of 1405 may be performed according to the methods described herein. In some examples, aspects of the operations of 1405 may be performed by a communication connection establisher as described with reference to FIGS. 7 through 9.

At 1410, the user device may determine one or more option selections corresponding to the menu of options. The operations of 1410 may be performed according to the methods described herein. In some examples, aspects of the operations of 1410 may be performed by an option selection component as described with reference to FIGS. 7 through 9.

At 1415, the user device may generate, based on the determined one or more option selections, a user interface at the user device, where the user interface includes an arrangement of elements corresponding to one or more of the determined one or more option selections. The operations of 1415 may be performed according to the methods described herein. In some examples, aspects of the operations of 1415 may be performed by an user interface generator as described with reference to FIGS. 7 through 9.

At 1420, the user device may receive an input from a user via the user interface, the input selecting one or more of the elements corresponding to a subset of the determined one or more option selections. The operations of 1420 may be performed according to the methods described herein. In some examples, aspects of the operations of 1420 may be performed by an input component as described with reference to FIGS. 7 through 9.

At 1425, the user device may transmit a response, via the communication connection, from the user device to the automated voice menu system based on the received input from the user, where the response is responsive to the audio feedback and indicates a selection of the subset of the determined one or more option selections. The operations of 1425 may be performed according to the methods described herein. In some examples, aspects of the operations of 1425 may be performed by a response transmission component as described with reference to FIGS. 7 through 9.

At 1430, the user device may replace one or more numbers of a keypad display with corresponding elements of the arrangement of elements. The operations of 1430 may be performed according to the methods described herein. In some examples, aspects of the operations of 1430 may be performed by an user interface generator as described with reference to FIGS. 7 through 9.

Figure 15:
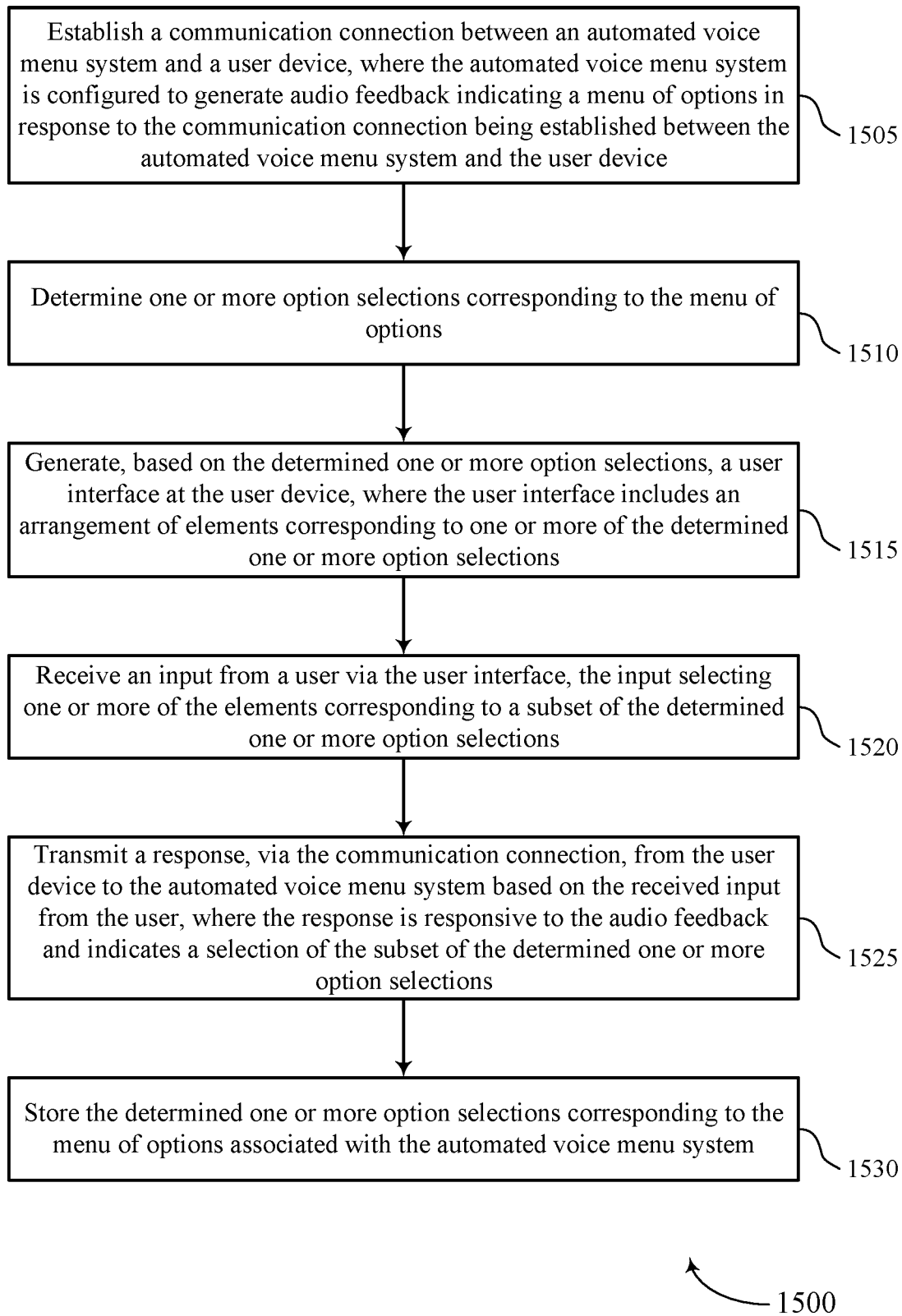

FIG. 15 shows a flowchart illustrating a method 1500 that supports audio menu navigation and option selection via display device in accordance with aspects of the present disclosure. The operations of method 1500 may be implemented by a user device or its components as described herein. For example, the operations of method 1500 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1505, the user device may establish a communication connection between an automated voice menu system and a user device, where the automated voice menu system is configured to generate audio feedback indicating a menu of options in response to the communication connection being established between the automated voice menu system and the user device. The operations of 1505 may be performed according to the methods described herein. In some examples, aspects of the operations of 1505 may be performed by a communication connection establisher as described with reference to FIGS. 7 through 9.

At 1510, the user device may determine one or more option selections corresponding to the menu of options. The operations of 1510 may be performed according to the methods described herein. In some examples, aspects of the operations of 1510 may be performed by an option selection component as described with reference to FIGS. 7 through 9.

At 1515, the user device may generate, based on the determined one or more option selections, a user interface at the user device, where the user interface includes an arrangement of elements corresponding to one or more of the determined one or more option selections. The operations of 1515 may be performed according to the methods described herein. In some examples, aspects of the operations of 1515 may be performed by an user interface generator as described with reference to FIGS. 7 through 9.

At 1520, the user device may receive an input from a user via the user interface, the input selecting one or more of the elements corresponding to a subset of the determined one or more option selections. The operations of 1520 may be performed according to the methods described herein. In some examples, aspects of the operations of 1520 may be performed by an input component as described with reference to FIGS. 7 through 9.

At 1525, the user device may transmit a response, via the communication connection, from the user device to the automated voice menu system based on the received input from the user, where the response is responsive to the audio feedback and indicates a selection of the subset of the determined one or more option selections. The operations of 1525 may be performed according to the methods described herein. In some examples, aspects of the operations of 1525 may be performed by a response transmission component as described with reference to FIGS. 7 through 9.

At 1530, the user device may store the determined one or more option selections corresponding to the menu of options associated with the automated voice menu system. The operations of 1530 may be performed according to the methods described herein. In some examples, aspects of the operations of 1530 may be performed by a storing component as described with reference to FIGS. 7 through 9.

Figure 16:
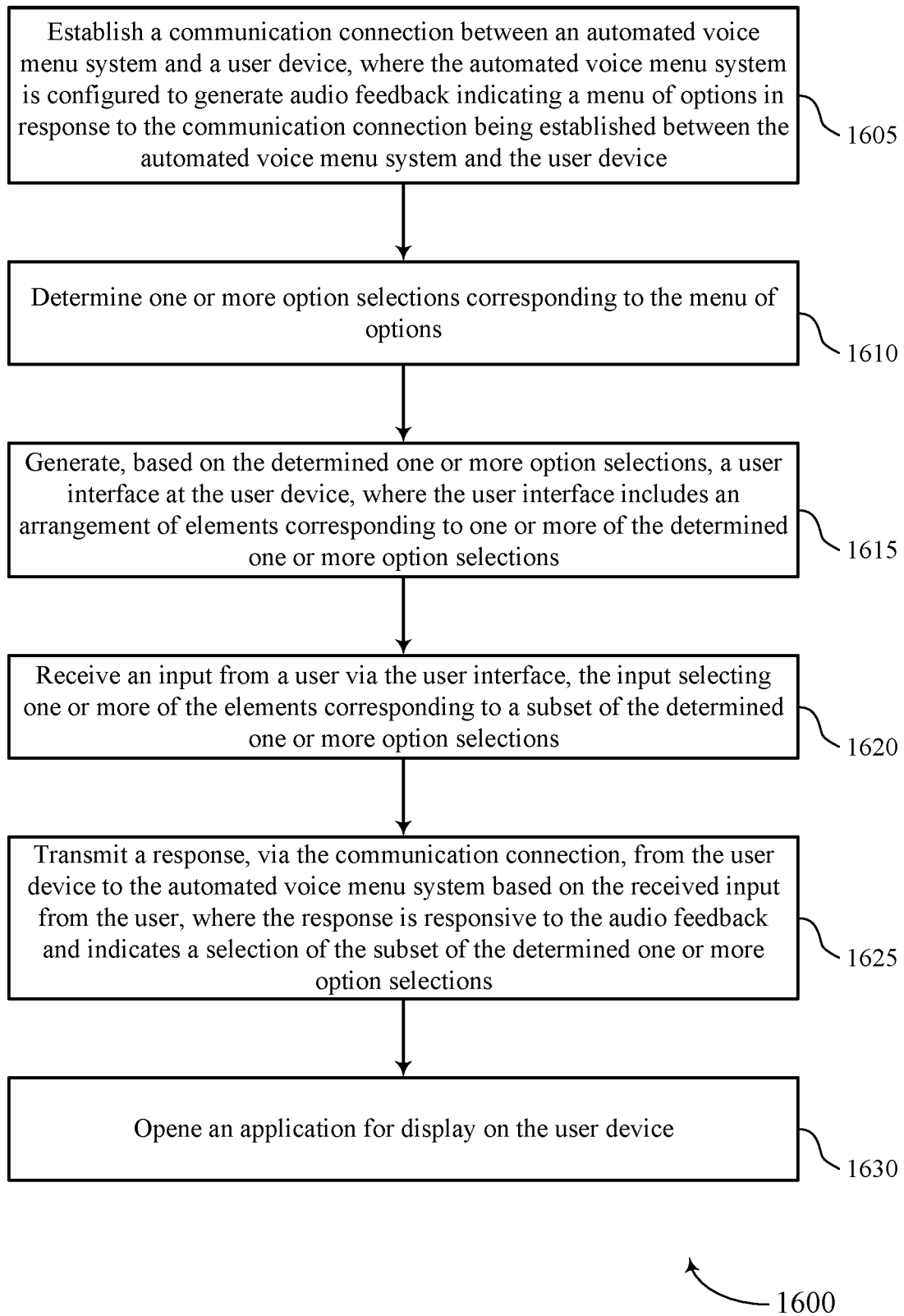

FIG. 16 shows a flowchart illustrating a method 1600 that supports audio menu navigation and option selection via display device in accordance with aspects of the present disclosure. The operations of method 1600 may be implemented by a user device or its components as described herein. For example, the operations of method 1600 may be performed by a communications manager as described with reference to FIGS. 7 through 9. In some examples, a user device may execute a set of instructions to control the functional elements of the user device to perform the functions described below. Additionally or alternatively, a user device may perform aspects of the functions described below using special-purpose hardware.

At 1605, the user device may establish a communication connection between an automated voice menu system and a user device, where the automated voice menu system is configured to generate audio feedback indicating a menu of options in response to the communication connection being established between the automated voice menu system and the user device. The operations of 1605 may be performed according to the methods described herein. In some examples, aspects of the operations of 1605 may be performed by a communication connection establisher as described with reference to FIGS. 7 through 9.

At 1610, the user device may determine one or more option selections corresponding to the menu of options. The operations of 1610 may be performed according to the methods described herein. In some examples, aspects of the operations of 1610 may be performed by an option selection component as described with reference to FIGS. 7 through 9.

At 1615, the user device may generate, based on the determined one or more option selections, a user interface at the user device, where the user interface includes an arrangement of elements corresponding to one or more of the determined one or more option selections. The operations of 1615 may be performed according to the methods described herein. In some examples, aspects of the operations of 1615 may be performed by an user interface generator as described with reference to FIGS. 7 through 9.

At 1620, the user device may receive an input from a user via the user interface, the input selecting one or more of the elements corresponding to a subset of the determined one or more option selections. The operations of 1620 may be performed according to the methods described herein. In some examples, aspects of the operations of 1620 may be performed by an input component as described with reference to FIGS. 7 through 9.

At 1625, the user device may transmit a response, via the communication connection, from the user device to the automated voice menu system based on the received input from the user, where the response is responsive to the audio feedback and indicates a selection of the subset of the determined one or more option selections. The operations of 1625 may be performed according to the methods described herein. In some examples, aspects of the operations of 1625 may be performed by a response transmission component as described with reference to FIGS. 7 through 9.

At 1630, the user device may open an application for display on the user device. The operations of 1630 may be performed according to the methods described herein. In some examples, aspects of the operations of 1630 may be performed by an user interface generator as described with reference to FIGS. 7 through 9.

A method of communications is described. The method may include establishing a communication connection between an automated voice menu system and a user device, where the automated voice menu system is configured to generate audio feedback indicating a menu of options in response to the communication connection being established between the automated voice menu system and the user device, determining one or more option selections corresponding to the menu of options, generating, based on the determined one or more option selections, a user interface at the user device, where the user interface includes an arrangement of elements corresponding to one or more of the determined one or more option selections, receiving an input from a user via the user interface, the input selecting one or more of the elements corresponding to a subset of the determined one or more option selections, and transmitting a response, via the communication connection, from the user device to the automated voice menu system based on the received input from the user, where the response is responsive to the audio feedback and indicates a selection of the subset of the determined one or more option selections.

An apparatus for communications is described. The apparatus may include a processor, memory coupled with the processor, and instructions stored in the memory. The instructions may be executable by the processor to cause the apparatus to establish a communication connection between an automated voice menu system and a user device, where the automated voice menu system is configured to generate audio feedback indicating a menu of options in response to the communication connection being established between the automated voice menu system and the user device, determine one or more option selections corresponding to the menu of options, generate, based on the determined one or more option selections, a user interface at the user device, where the user interface includes an arrangement of elements corresponding to one or more of the determined one or more option selections, receive an input from a user via the user interface, the input selecting one or more of the elements corresponding to a subset of the determined one or more option selections, and transmit a response, via the communication connection, from the user device to the automated voice menu system based on the received input from the user, where the response is responsive to the audio feedback and indicates a selection of the subset of the determined one or more option selections.

Another apparatus for communications is described. The apparatus may include means for establishing a communication connection between an automated voice menu system and a user device, where the automated voice menu system is configured to generate audio feedback indicating a menu of options in response to the communication connection being established between the automated voice menu system and the user device, determining one or more option selections corresponding to the menu of options, generating, based on the determined one or more option selections, a user interface at the user device, where the user interface includes an arrangement of elements corresponding to one or more of the determined one or more option selections, receiving an input from a user via the user interface, the input selecting one or more of the elements corresponding to a subset of the determined one or more option selections, and transmitting a response, via the communication connection, from the user device to the automated voice menu system based on the received input from the user, where the response is responsive to the audio feedback and indicates a selection of the subset of the determined one or more option selections.

A non-transitory computer-readable medium storing code for communications is described. The code may include instructions executable by a processor to establish a communication connection between an automated voice menu system and a user device, where the automated voice menu system is configured to generate audio feedback indicating a menu of options in response to the communication connection being established between the automated voice menu system and the user device, determine one or more option selections corresponding to the menu of options, generate, based on the determined one or more option selections, a user interface at the user device, where the user interface includes an arrangement of elements corresponding to one or more of the determined one or more option selections, receive an input from a user via the user interface, the input selecting one or more of the elements corresponding to a subset of the determined one or more option selections, and transmit a response, via the communication connection, from the user device to the automated voice menu system based on the received input from the user, where the response is responsive to the audio feedback and indicates a selection of the subset of the determined one or more option selections.

Some examples of the method, apparatuses, and non-transitory computer-readable medium described herein may further include operations, features, means, or instructions for transmitting, to the automated voice menu system, a capability message indicating a capability to generate the user interface at the user device including the arrangement of elements corresponding to the determined one or more option selections.

Some examples of the method, apparatuses, and non-transitory computer-readable medium described herein may further include operations, features, means, or instructions for receiving the input from the user via the user interface causes the user interface to display a second arrangement of elements corresponding to an additional one or more determined one or more option selections.

In some examples of the method, apparatuses, and non-transitory computer-readable medium described herein, receiving the input from the user may include operations, features, means, or instructions for receiving one of a touch input, a voice input, an expression input, or a combination thereof.

In some examples of the method, apparatuses, and non-transitory computer-readable medium described herein, transmitting a response from the user device to the automated voice menu system further may include operations, features, means, or instructions for transmitting, based on a reception capability of the automated voice menu system, one or both of a verbal response from the user or a non-verbal response corresponding to the one of the touch input, the expression input, or a combination thereof.

Some examples of the method, apparatuses, and non-transitory computer-readable medium described herein may further include operations, features, means, or instructions for converting the verbal response from the user into a non-verbal response corresponding to the verbal response from the user.

In some examples of the method, apparatuses, and non-transitory computer-readable medium described herein, generating the user interface at the user device including the arrangement of elements further may include operations, features, means, or instructions for replacing one or more numbers of a keypad display with corresponding elements of the arrangement of elements.

Some examples of the method, apparatuses, and non-transitory computer-readable medium described herein may further include operations, features, means, or instructions for storing the determined one or more option selections corresponding to the menu of options associated with the automated voice menu system.

Some examples of the method, apparatuses, and non-transitory computer-readable medium described herein may further include operations, features, means, or instructions for sharing, with one or more additional user devices, the stored determined one or more option selections associated with the automated voice menu system.

In some examples of the method, apparatuses, and non-transitory computer-readable medium described herein, generating the user interface at the user device including the arrangement of elements further may include operations, features, means, or instructions for opening an application for display on the user device.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communications, comprising:
   establishing a communication connection between an automated voice menu system and a user device, wherein the automated voice menu system is configured to generate audio feedback indicating a menu of options in response to the communication connection being established between the automated voice menu system and the user device;
   converting, at the user device, the audio feedback indicating the menu of options into one or more option selections in a visual format, the one or more option selections corresponding to the menu of options;
   storing the one or more option selections corresponding to the menu of options associated with the automated voice menu system;
   sharing, with one or more additional user devices, the stored one or more option selections associated with the automated voice menu system;
   generating, based at least in part on the one or more option selections, a user interface at the user device, wherein the user interface includes an arrangement of elements corresponding to one or more of the one or more option selections;
   receiving an input from a user via the user interface, the input selecting one or more of the elements corresponding to a subset of the one or more option selections; and
   transmitting a response, via the communication connection, from the user device to the automated voice menu system based at least in part on the received input from the user, wherein the response is responsive to the audio feedback and indicates a selection of the subset of the one or more option selections.

2. The method of claim 1, further comprising:
   transmitting, to the automated voice menu system, a capability message indicating a capability to generate the user interface at the user device including the arrangement of elements corresponding to the one or more option selections.

3. The method of claim 1, wherein receiving the input from the user via the user interface causes the user interface to display a second arrangement of elements corresponding to an additional one or more one or more option selections.

4. The method of claim 1, wherein receiving the input from the user comprises receiving one of a touch input, a voice input, an expression input, or a combination thereof.

5. The method of claim 4, wherein transmitting a response from the user device to the automated voice menu system further comprises:
   transmitting, based on a reception capability of the automated voice menu system, one or both of a verbal response from the user or a non-verbal response corresponding to the one of the touch input, the expression input, or a combination thereof.

6. The method of claim 4, further comprising:
   converting the verbal response from the user into a non-verbal response corresponding to the verbal response from the user.

7. The method of claim 1, wherein generating the user interface at the user device including the arrangement of elements further comprises:
   replacing one or more numbers of a keypad display with corresponding elements of the arrangement of elements.

8. The method of claim 1, wherein generating the user interface at the user device including the arrangement of elements further comprises:
   opening an application for display on the user device.

9. An apparatus for communication, comprising: a processor, memory coupled with the processor; and instructions stored in the memory and executable by the processor to cause the apparatus to:
   establish a communication connection between an automated voice menu system and a user device, wherein the automated voice menu system is configured to generate audio feedback indicating a menu of options in response to the communication connection being established between the automated voice menu system and the user device;

convert, at the user device, the audio feedback indicating the menu of options into one or more option selections in a visual format, the one or more option selections corresponding to the menu of options;

store the one or more option selections corresponding to the menu of options associated with the automated voice menu system;

share, with one or more additional user devices, the stored one or more option selections associated with the automated voice menu system;

generate, based at least in part on the one or more option selections, a user interface at the user device, wherein the user interface includes an arrangement of elements corresponding to one or more of the one or more option selections;

receive an input from a user via the user interface, the input selecting one or more of the elements corresponding to a subset of the one or more option selections; and transmit a response, via the communication connection, from the user device to the automated voice menu system based at least in part on the received input from the user, wherein the response is responsive to the audio feedback and indicates a selection of the subset of the one or more option selections.

10. The apparatus of claim 9, wherein the instructions are further executable by the processor to cause the apparatus to:

transmit, to the automated voice menu system, a capability message indicating a capability to generate the user interface at the user device including the arrangement of elements corresponding to the one or more option selections.

11. The apparatus of claim 9, wherein receiving the input from the user via the user interface causes the user interface to display a second arrangement of elements corresponding to an additional one or more one or more option selections.

12. The apparatus of claim 9, wherein the instructions to receive the input from the user are executable by the processor to cause the apparatus to receive one of a touch input, a voice input, an expression input, or a combination thereof.

13. The apparatus of claim 12, wherein the instructions to transmit a response from the user device to the automated voice menu system further are executable by the processor to cause the apparatus to:

transmit, based on a reception capability of the automated voice menu system, one or both of a verbal response from the user or a non-verbal response corresponding to the one of the touch input, the expression input, or a combination thereof.

14. The apparatus of claim 12, wherein the instructions are further executable by the processor to cause the apparatus to:

convert the verbal response from the user into a non-verbal response corresponding to the verbal response from the user.

15. The apparatus of claim 9, wherein the instructions to generate the user interface at the user device including the arrangement of elements further are executable by the processor to cause the apparatus to:

replace one or more numbers of a keypad display with corresponding elements of the arrangement of elements.

16. A non-transitory computer-readable medium storing code for communication, the code comprising instructions executable by a processor to:

establish a communication connection between an automated voice menu system and a user device, wherein the automated voice menu system is configured to generate audio feedback indicating a menu of options in response to the communication connection being established between the automated voice menu system and the user device;

convert, at the user device, the audio feedback indicating the menu of options into one or more option selections in a visual format, the one or more option selections corresponding to the menu of options;

store the one or more option selections corresponding to the menu of options associated with the automated voice menu system;

share, with one or more additional user devices, the stored one or more option selections associated with the automated voice menu system;

generate, based at least in part on the one or more option selections, a user interface at the user device, wherein the user interface includes an arrangement of elements corresponding to one or more of the one or more option selections;

receive an input from a user via the user interface, the input selecting one or more of the elements corresponding to a subset of the one or more option selections; and transmit a response, via the communication connection, from the user device to the automated voice menu system based at least in part on the received input from the user, wherein the response is responsive to the audio feedback and indicates a selection of the subset of the one or more option selections.

* * * * *